United States Patent
Kakuta et al.

(10) Patent No.: US 11,899,317 B2
(45) Date of Patent: Feb. 13, 2024

(54) LAMINATED GLASS, AND METHOD FOR MANUFACTURING LAMINATED GLASS

(71) Applicant: AGC Inc., Tokyo (JP)

(72) Inventors: Junichi Kakuta, Tokyo (JP); Takashi Shibuya, Tokyo (JP); Risa Kimura, Tokyo (JP); Yuhei Gima, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/106,790

(22) Filed: Feb. 7, 2023

(65) Prior Publication Data
US 2023/0176426 A1  Jun. 8, 2023

Related U.S. Application Data
(63) Continuation of application No. PCT/JP2021/029664, filed on Aug. 11, 2021.

(30) Foreign Application Priority Data
Aug. 21, 2020  (JP) ................. 2020-140208

(51) Int. Cl.
*G02F 1/1339* (2006.01)
*C09J 7/38* (2018.01)
(Continued)

(52) U.S. Cl.
CPC .............. *G02F 1/1339* (2013.01); *B32B 7/12* (2013.01); *B32B 17/10036* (2013.01);
(Continued)

(58) Field of Classification Search
CPC ...... G02F 1/1339; G02F 2202/28; C09J 7/38; C09J 2301/124; C09J 2301/302;
(Continued)

(56) References Cited

FOREIGN PATENT DOCUMENTS

| JP | 2016-164617 A | 9/2016 |
|---|---|---|
| JP | 2018168013 A | * 11/2018 |

(Continued)

OTHER PUBLICATIONS

International Searching Authority, "International Search Report," issued in connection with International Patent Application No. PCT/JP2021/029664, dated Oct. 12, 2021.
(Continued)

*Primary Examiner* — Edward J Glick
*Assistant Examiner* — William D Peterson
(74) *Attorney, Agent, or Firm* — Foley & Lardner LLP

(57) ABSTRACT

To provide a laminated glass in which color shading of an optical member is reduced, and a method for producing it. A laminated glass comprising
  a first glass plate,
  a second glass plate facing the first glass plate, and
  between the first glass plate and the second glass plate, a light control member to which a power feeder is connected, a bonding portion and a sealing member,
  wherein the sealing member overlaps with at least a part of the periphery of the first glass plate, in a plan view,
  the bonding portion is in contact with the first glass plate, the second glass plate, and a first principal surface, a second principal surface and side surfaces of the light control member, and
  the bonding portion contains a curable transparent resin.

22 Claims, 6 Drawing Sheets

(51) Int. Cl.
    *B32B 7/12*     (2006.01)
    *B32B 17/10*     (2006.01)
    *B32B 27/08*     (2006.01)
    *B32B 27/30*     (2006.01)
    *B60J 3/04*     (2006.01)
    *C03C 27/10*     (2006.01)
    *B60J 1/00*     (2006.01)

(52) U.S. Cl.
    CPC .. *B32B 17/10302* (2013.01); *B32B 17/10504* (2013.01); *B32B 17/10678* (2013.01); *B32B 17/10761* (2013.01); *B32B 17/10798* (2013.01); *B32B 17/10899* (2013.01); *B32B 27/08* (2013.01); *B32B 27/30* (2013.01); *B60J 3/04* (2013.01); *C03C 27/10* (2013.01); *C09J 7/38* (2018.01); *B32B 2307/412* (2013.01); *B32B 2307/542* (2013.01); *B32B 2307/712* (2013.01); *B32B 2307/732* (2013.01); *B60J 1/001* (2013.01); *C09J 2301/124* (2020.08); *C09J 2301/302* (2020.08); *G02F 2202/28* (2013.01); *G02F 2203/48* (2013.01)

(58) Field of Classification Search
    CPC ................ B32B 7/12; B32B 17/10302; B32B 17/10504; B32B 17/10899; B32B 27/08; C03C 27/10; B60J 1/001
    USPC .......................................................... 349/16
    See application file for complete search history.

(56) References Cited

FOREIGN PATENT DOCUMENTS

| | | | |
|---|---|---|---|
| JP | 2020126240 A | * | 8/2020 |
| WO | WO-2017/203809 A1 | | 11/2017 |
| WO | WO-2019/004160 A1 | | 1/2019 |
| WO | WO-2020/045389 A1 | | 3/2020 |

OTHER PUBLICATIONS

International Searching Authority, "Written Opinion," issued in connection with International Patent Application No. PCT/JP2021/029664, dated Oct. 12, 2021.

PCT International Preliminary Report on Patentability, dated Feb. 16, 2023, which includes a Translation of International Searching Authority, "Written Opinion," issued in connection with International Patent Application No. PCT/JP2021/029664, dated Oct. 12, 2021.

* cited by examiner

LAMINATED GLASS, AND METHOD FOR MANUFACTURING LAMINATED GLASS

CROSS-REFERENCE TO RELATED APPLICATIONS

This application is a Bypass Continuation of PCT Application No. PCT/JP2021/029664, filed on Aug. 11, 2021, which is based upon and claims the benefit of priority from Japanese Patent Application No. 2020-140208 filed on Aug. 21, 2020. The contents of those applications are incorporated herein by reference in their entireties.

TECHNICAL FIELD

The present invention relates to a laminated glass and a method for producing a laminated glass.

BACKGROUND ART

Heretofore, light control members capable of adjusting the light transmittance have been known. For example, a suspended particle device (SPD) utilizing suspended particles of which the arrangement state changes depending on the presence or absence of application of the electric field, and light control members utilizing a polymer dispersed liquid crystal (PDLC) or a guest host liquid crystal (GHLC) have been known.

Further, in recent years, production of a laminated glass having such a light control member sandwiched between glass plates has been proposed (for example, Patent Document 1). To bond glass plates, a polyvinyl butyral (PVB) resin and an ethylene/vinyl acetate copolymer (EVA) resin called an interlayer have been widely used. A laminate containing the resin is subjected to a high-temperature high-pressure treatment e.g. in an autoclave so as to sufficiently bond the glass plates. In such a case, the interlayer flows to fit the gap between the glass plates, due to high temperature. Further, the gap between the glass plates changes due to high pressure, and in some cases, the glass plate undergoes elastic deformation, and the amount of change of the gap is distributed. And, in conformity with such a change, the light control member also deforms, thus creating local color change (hereinafter sometimes referred to as discoloration) resulting from the deviation of the thickness of the light control member.

Further, in the light control member using a liquid crystal, which tends to cushion the force (stress) to deform the light control device applied to the light control device, by flowing of the liquid crystal, the liquid crystal is readily distributed unevenly and as a result, a problem of discoloration is likely to arise. Discoloration of the light control member is unfavorable in that aesthetics are impaired and the light transmittance/shielding performance is deteriorated.

PRIOR ART DOCUMENTS

Patent Document

Patent Document 1: JP-A-2016-164617

DISCLOSURE OF INVENTION

Technical Problem

Under these circumstances, the object of the present invention is to provide a laminated glass by which discoloration of a light control member is reduced.

Solution to Problem

According to an embodiment of the disclosure, provided is a laminated glass comprising
a first glass plate,
a second glass plate facing the first glass plate, and
between the first glass plate and the second glass plate, a light control member to which a power feeder is connected, a bonding portion and a sealing member,
wherein the sealing member overlaps with at least a part of the periphery of the first glass plate, in a plan view,
the bonding portion is in contact with the first glass plate, the second glass plate, and a first principal surface, a second principal surface and side surfaces of the light control member, and
the bonding portion contains a curable transparent resin.

According to an embodiment of the disclosure, provided is a method for producing a laminated glass comprising a first glass plate,
a second glass plate facing the first glass plate, and
between the first glass plate and the second glass plate, a light control member to which a power feeder is connected, a bonding portion and a sealing member,
which comprises a forming step of forming the sealing member on at least a part of the periphery of at least one of the first glass plate and the second glass plate in a plan view and forming the bonding portion containing a curable transparent resin on a principal surface of at least one of the first glass plate and the second glass plate,
a laminating step of forming a laminate in which the first glass plate, the bonding portion and the second glass plate are laminated in this order, and the bonding portion is in contact with the first glass plate, the second glass plate, and a first principal surface, a second principal surface and side surfaces of the light control member to which the power feeder is connected, and
a bonding step of bonding the first glass plate, the bonding portion, the second glass plate and the sealing member with one another in the laminate.

Advantageous Effects of Invention

According to an embodiment of the disclosure, a laminated glass by which discoloration of the light control member is reduced can be provided.

DESCRIPTION OF EMBODIMENTS

Figure 1:
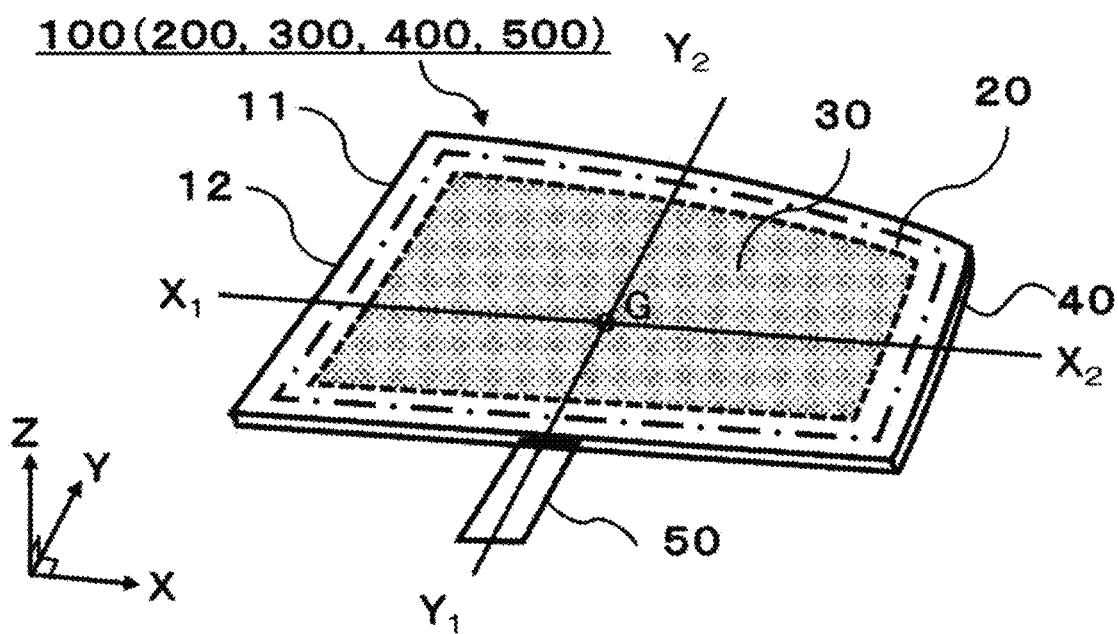
FIG. 1 is a perspective view illustrating a laminated glass according to a first embodiment.

In this specification, "cross section" means a cut area obtained by cutting the laminated glass in a thickness direction. "periphery" means an outermost edge of a predetermined member, and "peripheral portion" means an area in the vicinity of the "periphery". In a case where the predetermine member is in a frame-shape with a width, the "periphery" is also called "outer periphery" to be distinguished from "inner periphery" which is the inner peripheral edge. The "same shape" and the "same dimensions" mean the same shape and the same dimensions as viewed with human eyes. Unless otherwise specified, "substantially" means to be the same as viewed by human eyes. "to" used to show the range of the numerical values is used to include the upper and lower limit values.

The laminated glass of the present invention is disposed, for example, for a window glass of a building, a show case, a transparent partition, a part which external light enters such as a vehicle window (for example, a windshield, a side window, a quarter window, a roof window, a rear window, or a rear extra window disposed at the back side of a vehicle than the rear window), and is capable of controlling the amount of incident light into the interior of a building, a vehicle or the like.

In the following, an example is shown in which the laminated glass of the present invention is used for a vehicle side window, but the present invention is not limited thereto. Vehicles typically mean automobiles but mean moving objects having a laminated glass, including trains, ships, aircrafts, etc. Further, the embodiments in the drawings are shown schematically to clearly describe the present invention, and the drawings do not accurately represent the actual product size and scale.

First Embodiment

Now, the first embodiment will be described with reference to FIGS. 1 to 4. FIG. 1 is a perspective view illustrating a laminated glass according to the first embodiment of the present invention, and also illustrates second to fifth embodiments described later.

FIG. 1 is a perspective view illustrating a laminated glass 100 according to the present embodiment. In FIG. 1, when the laminated glass 100 is attached to a vehicle, the longitudinal direction of the vehicle is taken as the X-axis direction, the vertical direction of the vehicle as the Y-axis direction, and a direction perpendicular to the XY plane as the Z-axis direction (the same applies to the other drawings). However, when the laminated glass 100 is used for a windshield for example, reinterpretation is possible within a range not to impair the effects of the present invention, such that the left-right direction of a vehicle to which the laminated glass 100 is mounted is taken as the X-axis direction, the vertical direction of the vehicle as the Y-axis direction and a direction perpendicular to the XY-plane as the Z-axis direction.

The laminated glass 100 according to the present embodiment comprises a first glass plate 11 and a second glass plate 12 having principal surfaces in substantially the same shape, a bonding portion 20 disposed between them, and a sealing member 40 at the periphery of the bonding portion 20. And, the first glass plate 11, the bonding portion 20 and the second glass plate 12 are laminated in this order. Further, the center axis (not shown) of the laminated glass 100 is taken as a vertical line in a thickness direction passing the center of gravity G of the laminated glass 10. In FIG. 1, the laminated glass 100 is curved only in the Y axis direction, but may be curved in the X axis direction, or may be curved in the X axis direction and in the Y axis direction. Further, in FIG. 1, the convex surface of the first glass plate 11 and the concave surface of the second glass plate 12 face each other, however, a combination contrary thereto is possible, that is, a convex surface of one glass plate faces a concave surface of the other glass plate.

As shown in FIG. 1, the laminated glass 100 is substantially trapezoidal in a plan view, but is not limited thereto. The laminated glass 100 may, for example, be substantially triangle or substantially rectangular, depending upon the object or the portion on which the laminated glass is to be mounted. "Substantially" here means that distinction between a straight line and a curved line, as to whether the sides are in parallel with each other or not, the angle of the apex, etc., are not strictly defined. "In a plan view" means that a predetermined region of the laminated glass 100 is viewed from the normal direction (the positive direction of the X-axis) of a surface of the first glass plate 11 on the opposite side from the second glass plate. Further, "viewed cross sectionally" means to be viewed in a direction vertical to a predetermined cross section of the laminated glass.

Further, at least a part of the cross section of the laminated glass 100 in the vertical direction (the Y axis direction) may have a wedge shape such that the thickness gradually decreases. A laminated glass the cross sectional shape of which in the vertical direction is wedge shape such that at least a part thickens from the lower side toward the upper side, is suitable for a head-up display (HUD), and is used suitably particularly as a windshield. In order that the laminated glass 10 has such a cross sectional shape, at least one of the first glass plate 11, the second glass plate 12 and the bonding portion 20 has a wedge shape at least at a part in the vertical direction.

The laminated glass 100 according to the present embodiment has a light control member 30 inside the bonding portion 20. And, the light control member 30 is connected to a power feeder 50. In a plan view, the light control member 30 is disposed at the inner side than the sealing member 40, and the periphery of the light control member 30 is adjacent to the inner periphery of the sealing member 40. The light control member 30 has two principal surfaces, and the principal surface on the first glass plate 11 side is taken as the first principal surface and the principal surface on the second glass plate 12 side as the second principal surface. A simply expressed principal surface of the light control member 30 means at least one of the first principal surface and the second principal surface.

The bonding portion 20 contains at least one of a curable transparent resin also called Optical Clear Resin (OCR), and a transparent pressure-sensitive adhesive sheet also called Optical Clear Adhesive (OCA). The curable transparent resin and the transparent pressure-sensitive adhesive sheet are members having adhesion corresponding to a 90° peel strength (N/25 mm) at 25° C. of 0.01 N/25 mm or more, preferably 0.1 N/25 mm or more. The curable transparent resin is liquid (see shear viscosity described later) at room temperature in the vicinity of 25° C., thereby can fill the gap between glass and the adherend, and realizes the above-described adhesion after being cured, thereby does not necessarily require a step of high-temperature high-pressure treatment for bonding the glass plates. The transparent pressure-sensitive adhesive sheet is closely attached to a glass plate surface at room temperature in the vicinity of 25° C. and can be bonded while interface bubbles are removed, and thus it also does not necessarily require a step of high-temperature high-pressure treatment for bonding the glass plates. Accordingly, the light control member 30 is less likely to undergo deformation, and deviation of the thickness of the light control member 30 which should keep a uniform thickness is less likely to occur, and thus discoloration can be reduced.

The 90° peel strength test at 25° C. may be carried out in accordance with JIS Z0237:2009. For example, with respect to the curable transparent resin, the 90° peel strength test at 25° C. may be carried out as follows. First, a frame-shaped spacer having a thickness of 0.5 mm is inserted between a PET film having a thickness of 100 μm, one side of which is subjected to release treatment, and a PET film having a thickness of 100 μm, which is not subjected to release treatment. Then, between the two PET films, the curable transparent resin before curing is poured and then cured to from a resin sheet having a thickness of 0.5 mm. The obtained resin sheet is cut into the above JIS specification size, and the PET film, one side of which is subjected to release treatment, is removed. Finally, the released surface of the resin sheet is bonded to an aluminosilicate glass, and the 90° peel test is carried out at 25° C. with the PET film having a thickness of 100 μm, which is not subjected to release treatment, attached. The type of the PET film is not limited, and for example, "Lumirror (registered trademark)" may be used.

The curable transparent resin is in a liquid state at ordinally temperature under normal pressure before curing. The shear viscosity at 25° C. of the curable transparent resin before curing at ordinally temperature under normal pressure is preferably 100 mPa·s or more, whereby good handling efficiency is obtained, and is preferably 100,000 mPa·s or less, whereby the liquid is likely to spread. The bonding portion 20 preferably contains a curable transparent resin, whereby the bonding portion 20 containing the light control member 30 easily fits the desired shape, at a stage where a laminate having the first glass plate 11, the bonding portion 20 and the second glass plate 12 laminated in this order is formed. By the bonding portion 20 containing the curable transparent resin, the light control member 30 is less likely to undergo deformation, and deviation of the thickness is less likely to occur, and thus discoloration can be reduced.

The sealing member 40 is a member provided in a frame shape to prevent at least one of the curable transparent resin and the transparent pressure-sensitive adhesive sheet contained in the bonding portion 20 from protruding outside the glass plate. Here, "inside" represents a center axis direction passing the center of gravity G of the laminated glass 100 as viewed from the periphery of a predetermined member (for example the first glass plate 11). Further, "outside" represents the periphery direction of a predetermined member (the first glass plate 11) as viewed from the center axis passing the center of gravity G of the laminated glass 100. In FIG. 1, the dotted line indicates the periphery of the light control member 30, and the dash-dotted line indicates the inner periphery of the sealing member 40.

The sealing member 40 overlaps with the entire periphery of the first glass plate 11 and the second glass plate 12 in a plan view. However, the sealing member 40 has to overlap with at least a part of the periphery of the first glass plate 11 or the second glass plate 12. Specifically, when the periphery of the first glass plate 11 is located inside the periphery of the second glass plate 12, the sealing member 40 may overlap only with the periphery of the first glass plate 11.

The planar shape of the light control member 30 substantially agrees with the shape of the first glass plate 11 in FIG. 1, however, it may be substantially circular, substantially elliptic, substantially triangular, substantially rectangular, substantially trapezoidal or n-angular (n is an integer of 5 or more), or the like. The power feeder 50 is usually a flexible material. The power feeder 50 may be electrically connected directly to the light control member 30 or may be electrically connected via a transparent conductive film or a foil conductor called a bus bar. The connection method may be a known optional means.

Further, the laminated glass 100 may have a strip light-shielding portion at a peripheral portion of at least one of the first glass plate 11 and the second glass plate 12. The light-shielding portion can shield the periphery of the light control member 30, the sealing member 40, the power feeder 50, the attachment portion to a frame of the vehicle, etc. entirely or partly. Further, the light-shielding portion can prevent a urethane resin used when the sealing member 40 or the laminated glass 100 is bonded to the vehicle, from being deteriorated e.g. by ultraviolet rays.

Figure 2:
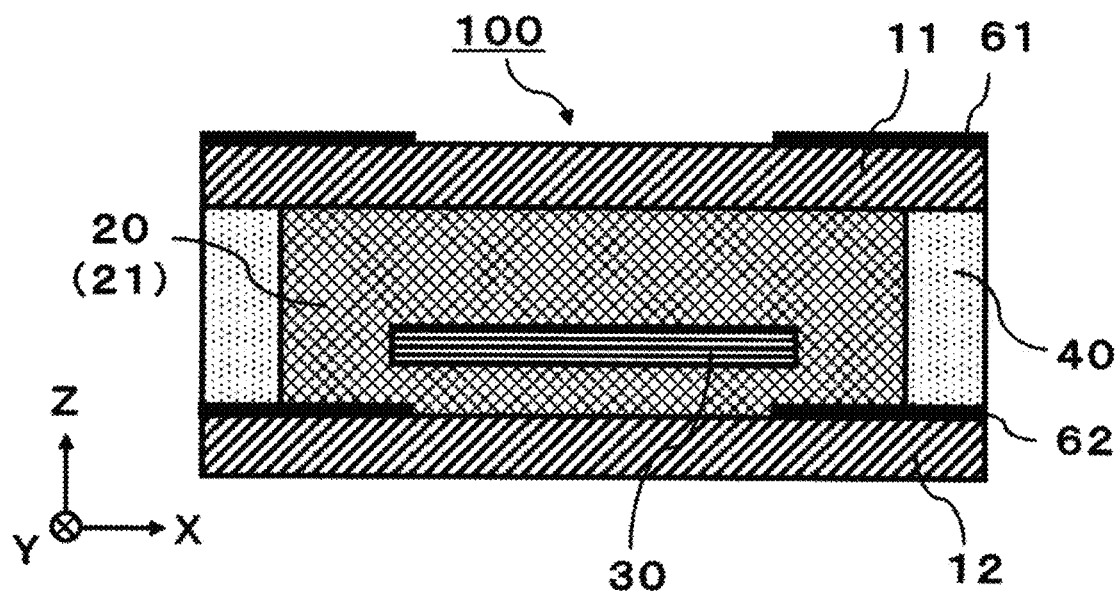
FIG. 2 is a cross sectional view illustrating a laminated glass according to a first embodiment.

FIG. 2 is a cross sectional view illustrating the laminated glass 100 shown in FIG. 1 as viewed from the Y axis direction when cut on the XZ plane at the position $X_1$-$X_2$ in FIG. 1 (hereinafter sometimes referred to as "$X_1$-$X_2$ cross sectional view"). In the present embodiment, the bonding portion 20 has only the first adhesive layer 21. And, the first adhesive layer 21 is in contact with the first glass plate 11, the second glass late 12, the light control member 30 and the sealing member 40. Further, the first adhesive layer 21 is in contact with the first principal surface, the second principal surface and side surfaces (that is the whole surface) of the light control member 30. Accordingly, in a production process of bonding the bonding portion 20 with other members to form the laminated glass 100, even when the laminate containing the light control member 30 is pressurized, the first adhesive layer 21 is less likely to flow, and a stress is less likely to be applied to the light control member 30, as compared with a case where the first adhesive layer 21 is in contact with only a part of the surface (for example, the principal surface of the light control member 30). As a result, discoloration can be reduced. The first adhesive layer 21 may have either of the transparent pressure-sensitive adhesive sheet and the curable transparent resin, and preferably has the curable transparent resin, with which a stress is less likely to be applied to the light control member 30.

The sealing member 40 is in contact with the first glass plate 11 and the second glass plate 12. In a plan view, the sealing member 40 overlaps with the entire periphery of the first glass plate 11 and the second glass plate 12, and thus the first adhesive layer 21 is less likely to protrude from the periphery of the laminated glass 100. Accordingly an operation to remove the protruding bonding portion 20 can be omitted.

Of the first glass plate 11, at the peripheral portion on the principal surface (concave surface) on the opposite side from the light control member 30, a light-shielding portion 61 may be formed, and of the second glass plate 12, at the peripheral portion on the principal surface (concave surface) on the light control member 30 side, a light-shielding portion 62 may be formed. The light-shielding portion 61 and the light-shielding portion 62 may be formed in the following FIGS. 3 and 4 also.

Figure 3A:
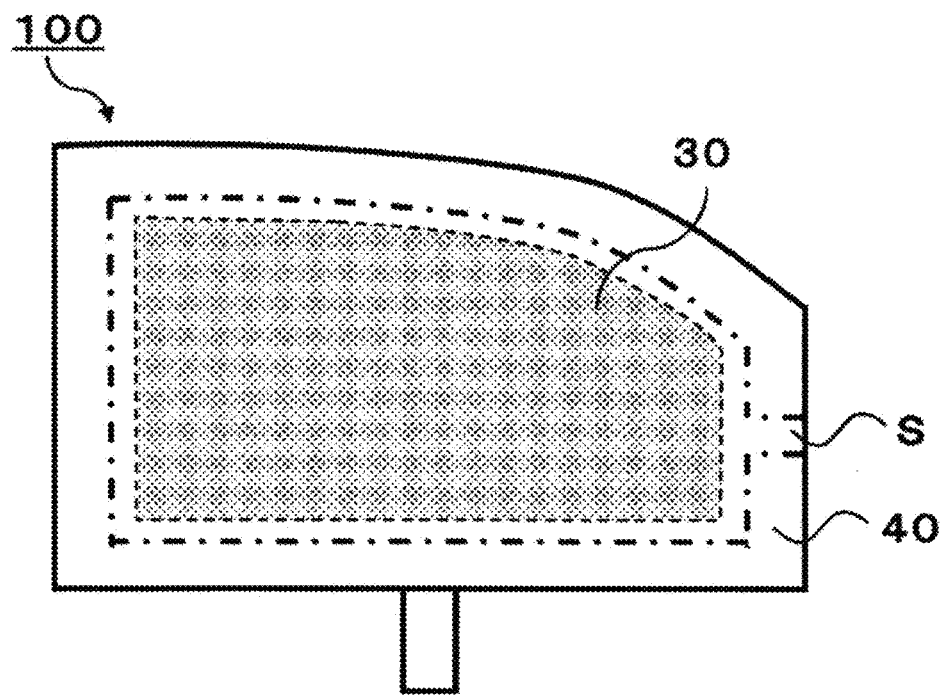
FIGS. 3(a) and 3(b) are plan view and cross sectional view illustrating a laminated glass according to a first embodiment.
Figure 3B:
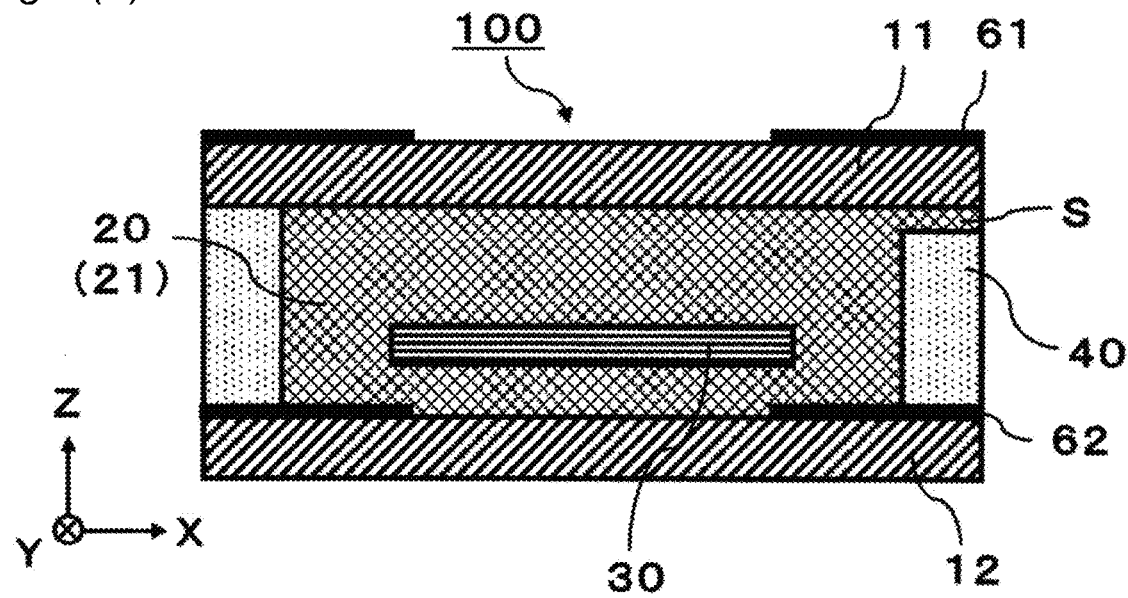

FIG. 3(a) is a plan view and FIG. 3(b) is a $X_1$-$X_2$ cross sectional view of the laminated glass 100 shown in FIG. 1. The sealing member 40 may have one or more spaces S which are partly not in contact with at least one of the first glass plate 11 and the second glass plate 12. For example, the sealing member 40 may not be partly in contact with the first glass plate 11 and is in contact with the second glass plate 12. Otherwise, the sealing member 40 may not be partly in contact with both the first glass plate 11 and the second glass plate 12.

The space S is provided in a part of the sealing member 40 separately from a portion through which the power feeder 50 passes, and acts for example as a hole to form the bonding portion 20 by injecting a resin. Further, the space S may be used to let bubbles in the bonding portion 20 or the pressure applied to the bonding portion 20 at the time of bonding the glass plates, go. Since the space S is present only partly, even if the first adhesive layer 21 protrudes from the periphery of the first glass plate 11 or the second glass plate 12, it can readily be removed. The space S is suitably provided in a case where the first adhesive layer 21 has a curable transparent resin.

Figure 4:
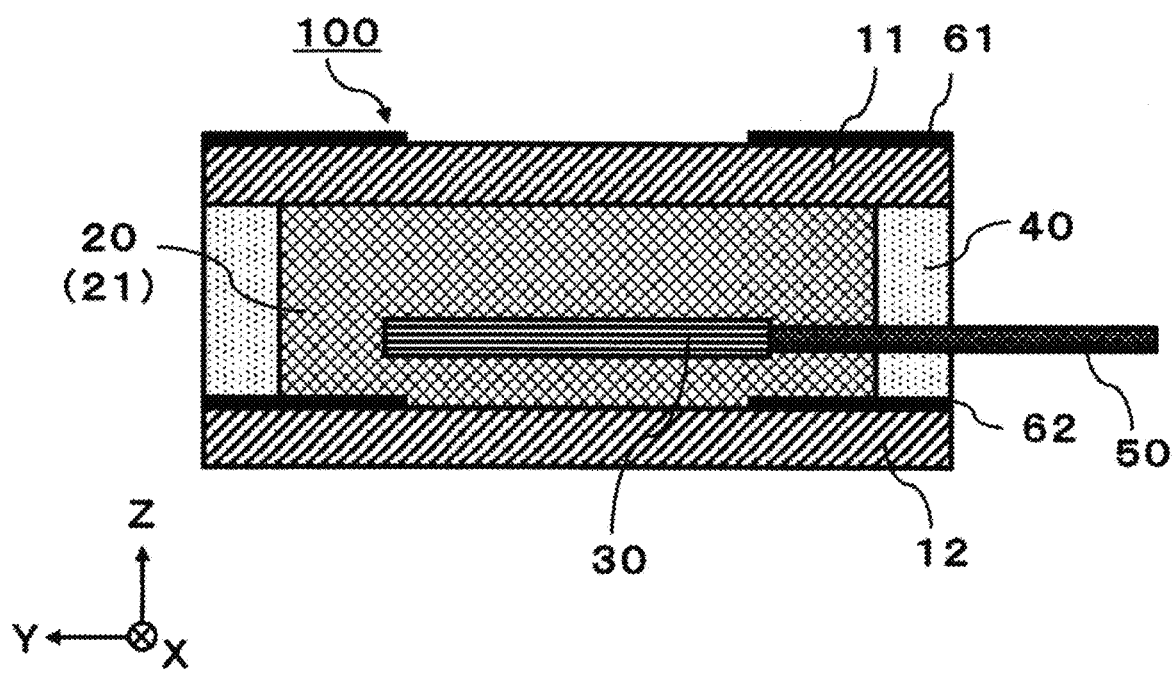
FIG. 4 is a cross sectional view illustrating a laminated glass according to a first embodiment.

FIG. 4 is a cross sectional view illustrating the laminated glass 100 shown in FIG. 1 as viewed from the X axis direction when cut on the YZ plane at the position $Y_1$-$Y_2$ in FIG. 1 (hereinafter sometimes referred to as "$Y_1$-$Y_2$ cross sectional view"). The power feeder 50 is supported by the bonding portion 20 and the sealing member 40. One end of the power feeder 50 is connected to the light control member 30. The other end of the power feeder 50 is connected to an external power source such as a vehicle battery to supply an electric power to the light control member 30.

In FIGS. 1 and 4, one power feeder 50 is connected to a side surface (XZ plane) of the light control member 30, however, two or more power feeders 50 may be connected. For example, two or more power feeders 50 may be connected to one side surface of the light control member 30, may be connected to different side surfaces, or may be connected to one or more side surfaces and another surface. That is, so long as the power feeder 50 extends to any direction in the XY plane, it may be connected to a principal surface of the light control member 30.

Figure 5:
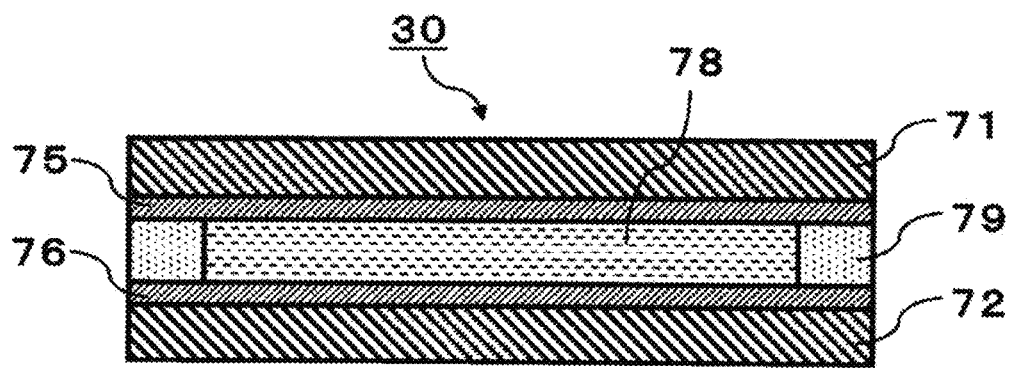
FIG. 5 is a cross sectional view illustrating an example of a constitution of a light control member.

FIG. 5 is a cross sectional view illustrating an example of a constitution of the light control member 30 which can be used for the laminated glass 100 according to the first embodiment. The light control member 30 has a light control device 78 between a first substrate 71 on which a first conductive layer 75 is provided, and a second substrate 72 on which a second conductive layer 76 is provided. Further, the periphery of the light control device 78 is in contact with the sealing material 79.

The first substrate 71 and the second substrate 72 are sheet-formed dielectric constituted by a transparent material and is preferably flexible. In the laminated glass 100 according to the first embodiment, whether the first substrate 71 and the second substrate 72 face the first glass plate 11 or the second glass plate 12, may optionally be selected. For example, the light control member 30 may be disposed so that the first substrate 71 faces the first glass plate 11 and the second substrate 72 faces the second glass plate 12.

The first conductive layer 75 and the second conductive layer 76 are preferably transparent at least to such an extent that from one side of the light control member 30, the other side can be visually recognized. In FIG. 5, the first conductive layer 75 and the second conductive layer 76 are formed over the entire surface of the first substrate 71 and the second substrate 72, however, they may be formed only on a part of the first substrate 71 and the second substrate 72.

Further, in the light control member 30, electrodes as a pair in the power feeder 50 shown in FIGS. 1 and 4 are electrically connected to the first conductive layer 75 and the second conductive layer 76 respectively. The light control device 78 has a liquid crystal, and by applying a voltage between the first conductive layer 75 and the second conductive layer 76, the visible light transmittance changes. The light control device 78 may be a device which drives at so-called normal mode such that the visible light transmittance is high (light state) when a voltage is applied and the visible light transmittance is low (dark state) when no voltage is applied, or may be a device which drives at reverse mode on the contrary. The light control device 78 may properly contain a dichroic dye, a spacer or the like. The sealing material 79 may be provided as the case requires and may not be provided.

Second Embodiment

Figure 6:
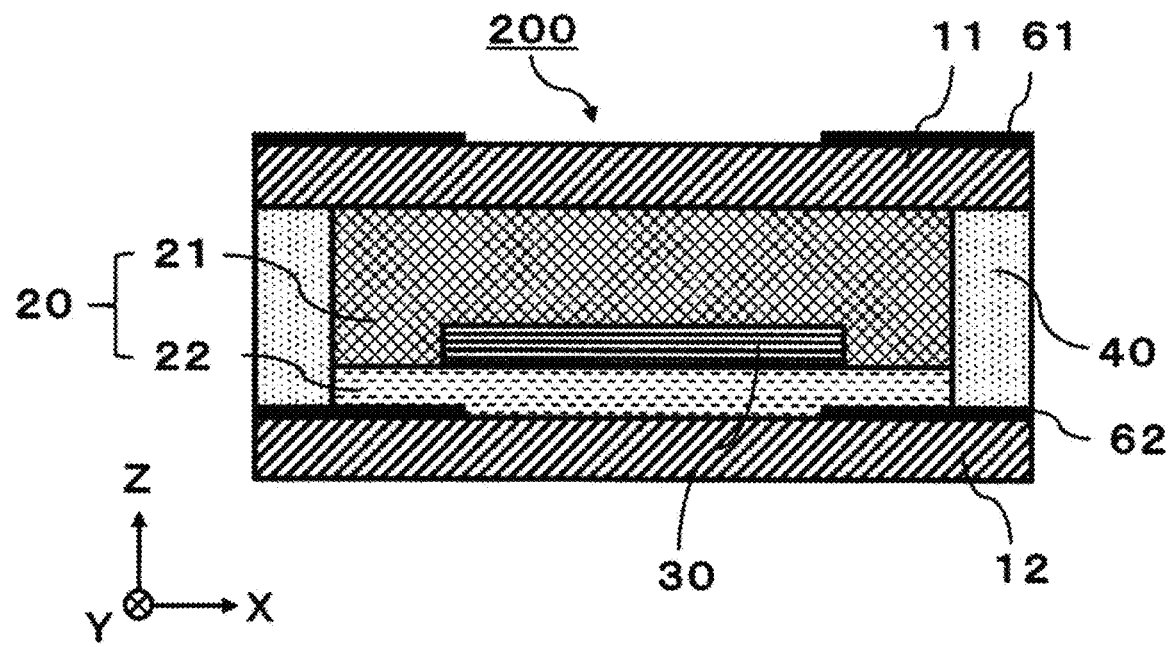
FIG. 6 is a cross sectional view illustrating a laminated glass according to a second embodiment.

FIG. 6 is a $X_1$-$X_2$ cross sectional view illustrating a laminated glass 200 according to a second embodiment. In the present embodiment, points different from the laminated glass 100 according to the first embodiment will be described, and for the other points, descriptions in the first embodiment are incorporated herein. The present embodiment is different from the first embodiment in that the bonding portion 20 has a first adhesive layer 21 and a second adhesive layer 22.

In the present embodiment, the bonding portion 20 has a first adhesive layer 21 and a second adhesive layer 22, and the first glass plate 11, the first adhesive layer 21, the second adhesive layer 22 and the second glass plate 12 are laminated in this order. And, the first adhesive layer 21 is in contact with the first glass plate 11, the second adhesive layer 22, the sealing member 40, and a first principal surface and side surfaces of the light control member 30. The second adhesive layer 22 is in contact with the second glass plate 12, the first adhesive layer 21, the sealing member 40, and a second principal surface of the light control member 30. The whole surface of the light control member 30 is held by the first adhesive layer 21 and the second adhesive layer 22. The first adhesive layer 21 is in contact with the first principal surface and all side surfaces of the light control member 30, and the second adhesive layer 22 is in contact with the entire second principal surface of the light control member 30.

The first adhesive layer 21 and the second adhesive layer 22 respectively may have either of the curable transparent resin and the transparent pressure-sensitive adhesive sheet, and in order that a stress is less likely to be applied to the light control member 30, it is preferred that at least one of the first adhesive layer 21 and the second adhesive layer 22 has the curable transparent resin. For example, the first adhesive layer 21 may have the curable transparent resin and the second adhesive layer 22 may have the transparent pressure-sensitive adhesive sheet. By side surfaces of the light control member 30 being held by the curable transparent resin, discoloration can significantly be reduced. Further, in a case where the principal surface of the light control member 30 is in contact with the transparent pressure-sensitive adhesive sheet corresponding to the second adhesive layer 22, the glass plates will not undergo slippage when bonded.

Further, for example, both the first adhesive layer 21 and the second adhesive layer 22 may have the curable transparent resin. By using the curable transparent resin for such adhesive layers, the position of the light control member 30 in the Z axis direction is likely to be adjusted. The respective adhesive layers (for example the two curable transparent resins) may be made of the same material or different materials. In a case where the first adhesive layer 21 and the second adhesive layer 22 are made of the same material, their boundary is less likely to be noticeable. In a case where they are made of different materials, when the laminated glass 200 is attached to a vehicle, properties of the adhesive layer positioned on the vehicle exterior side and properties of the adhesive layer positioned on the vehicle interior side can be made different from each other.

In FIG. 6, the contact interface between the first adhesive layer 21 and the second adhesive layer 22 is on the same plane as the second principal surface of the light control member 30, however, the position is not limited thereto. The contact interface between the first adhesive layer 21 and the second adhesive layer 22 may, for example, be on the same plane as the first principal surface of the light control member 30, or may be at an optional position between the second principal surface and the first principal surface of the light control member 30.

In order to prevent concentration of the stress applied to the light control member 30, it is preferred that at least a part of side surfaces of the light control member 30 is in contact with the adhesive layer containing the curable transparent resin (for example the first adhesive layer 21). The area with which the adhesive layer containing the curable transparent resin is in contact, to the area of the entire side surfaces of the light control member 30, is preferably 20% or more, more preferably 50% or more, further preferably 70% or more, particularly preferably 95% or more.

Third Embodiment

Figure 7:
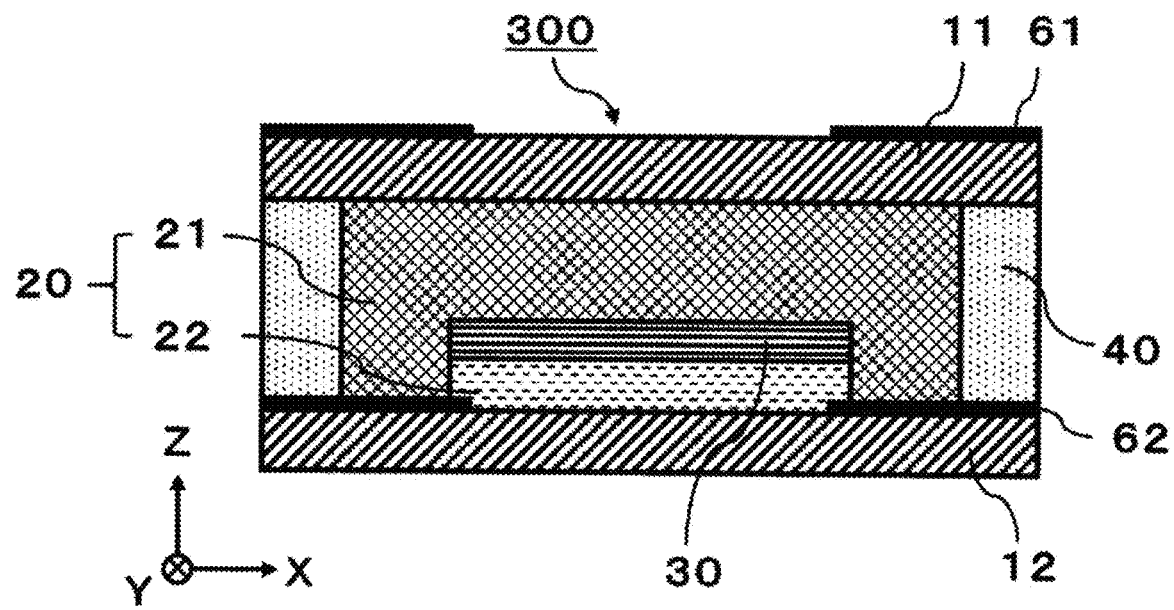
FIG. 7 is a cross sectional view illustrating a laminated glass according to a third embodiment.

FIG. 7 is a $X_1$-$X_2$ cross sectional view illustrating a laminated glass 300 according to a third embodiment. In the present embodiment, points different from the laminated glass 200 according to the second embodiment will be described, and for the other points, descriptions in the second embodiment are incorporated herein. The present embodiment is different from the second embodiment in that the second adhesive layer 22 is not in contact with the sealing member 40.

In the present embodiment, the first glass plate 11, the first adhesive layer 21 and the second glass plate 12 are laminated in this order. Further, the first glass plate 11, the light control member 30, the second adhesive layer 22 and the second glass plate 12 are laminated in this order. The first adhesive layer 21 is in contact with the first principal surface and side surfaces of the light control member 30, and the second adhesive layer 22 is in contact with the second glass plate 12, the first adhesive layer 21 and the second principal surface of the light control member 30. In the laminated glass 300 according to the present embodiment also, as in the laminated glass 200 according to the second embodiment, by the whole surface of the light control member 30 being held by the first adhesive layer 21 and the second adhesive layer 22, discoloration can be reduced. The first adhesive layer 21 is in contact with the first principal surface and all side surfaces of the light control member 30, and the second adhesive layer 22 is in contact with the entire second principal surface of the light control member 30.

In the laminated glass 300 shown in FIG. 7, the periphery of the second adhesive layer 22 (in a plan view) agrees with the periphery of the light control member 30, however, it does not have to agree with it. For example, in a plan view, the periphery of the second adhesive layer 22 may be inside or outside of the periphery of the light control member 30. Further, the second adhesive layer 22 may partly be in contact with the sealing member 40 as the laminated glass 200. In such a case, both the first adhesive layer 21 and the second adhesive layer 22 are in contact with the second glass plate 12.

Further, the periphery of the second adhesive layer 22 in a plan view may be adjusted so that it does not overlap with the light-shielding portion 62, it is in contact with the light-shielding portion 62, or it slightly overlaps with the light-shielding portion 62. By adjusting the peripheral position of the second adhesive layer 22, two or more types of the transparent resins can be used depending upon the application, such that a photo-curable type curable transparent resin is used for the second adhesive layer 22, and a curable transparent resin other than a photocurable type is used for the first adhesive layer 21. In a case where the second adhesive layer 22 contains a curable transparent resin, a sealing member (not shown) may be separately provided at the periphery of the second adhesive layer 22.

Fourth Embodiment

Figure 8:
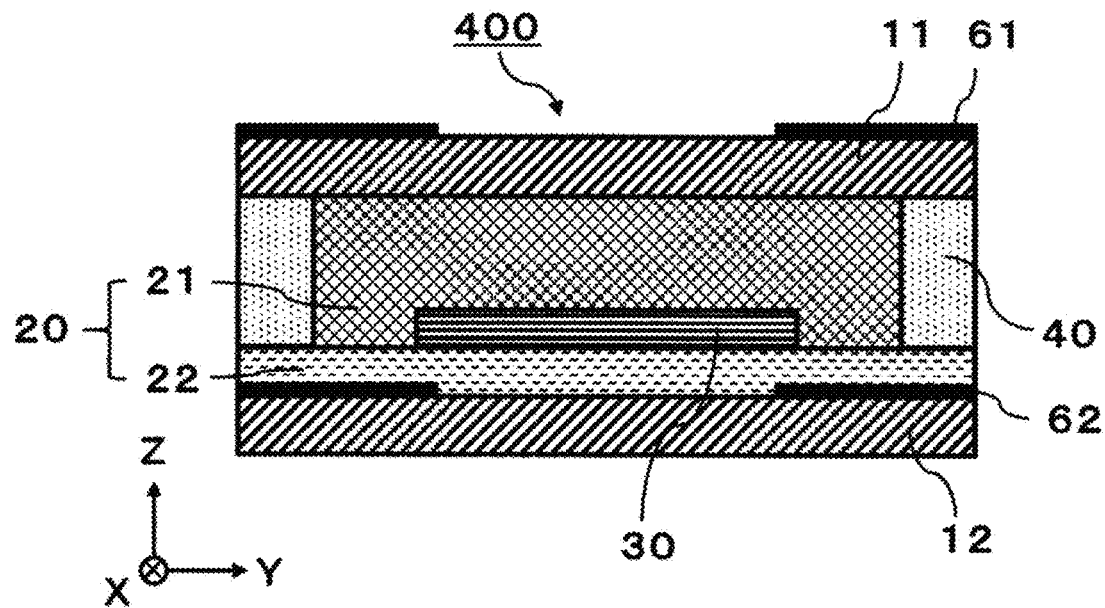
FIG. 8 is a cross sectional view illustrating a laminated glass according to a fourth embodiment.

FIG. 8 is a $X_1$-$X_2$ cross sectional view illustrating a laminated glass 400 according to a fourth embodiment. In the present embodiment, points different from the laminated glass 200 according to the second embodiment will be described, and for the other points, descriptions in the second embodiment are incorporated herein. The present embodiment is different from the second embodiment in that the sealing member 40 is not in contact with the second glass plate 12.

In the present embodiment, the sealing member 40 is in contact with the first glass plate 11, the first adhesive layer 21 and the second adhesive layer 22. And, in a plan view, the second adhesive layer 22 overlaps with the entire surface of the second glass plate 12, and the periphery of the second adhesive layer 22 agrees with the periphery of the second glass plate 12 (the first glass plate 11). Accordingly, the position of the second adhesive layer 22 can readily be set relative to the second glass plate 12. In the present embodiment, the second adhesive layer 22 is not in contact with the inner periphery of the sealing member 40 and is exposed to the outside of the laminated glass 400. Accordingly, in the present embodiment, the second adhesive layer 22 is preferably the transparent pressure-sensitive adhesive sheet. The first adhesive layer 21 is in contact with the first principal surface and all side surfaces of the light control member 30, and the second adhesive layer 22 is in contact with the entire second principal surface of the light control member 30.

Figure 9:
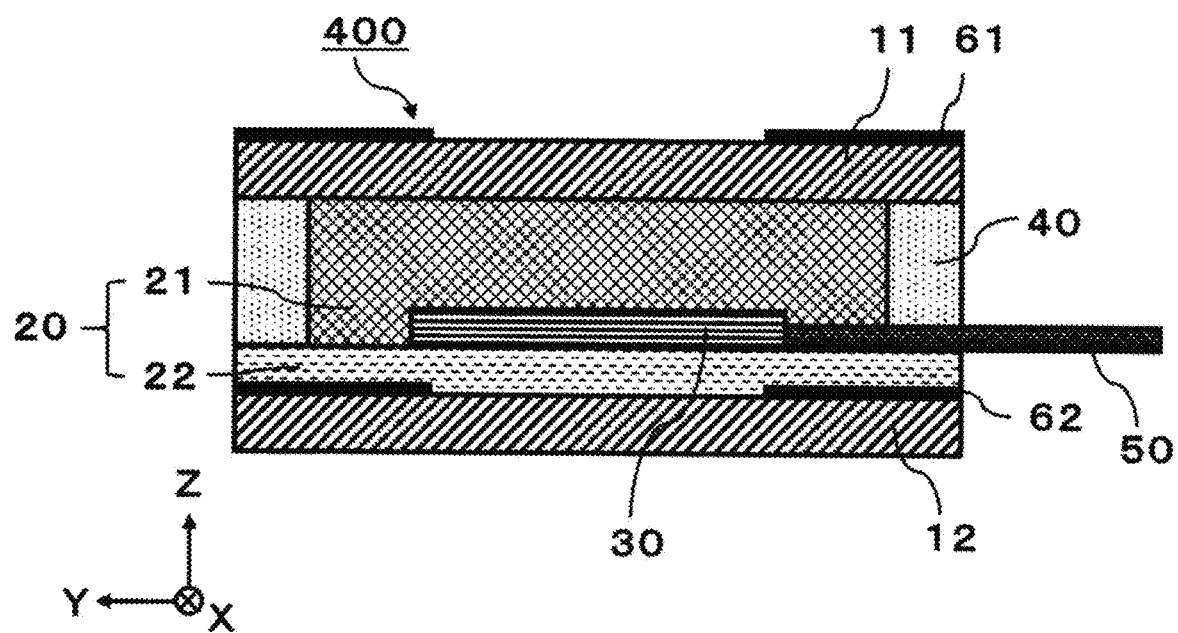
FIG. 9 is a cross sectional view illustrating a laminated glass according to a fourth embodiment.

FIG. 9 is a $Y_1$-$Y_2$ cross sectional view illustrating the laminated glass 400 according to the fourth embodiment. In the present embodiment, the power feeder 50 is supported by the first adhesive layer 21 and the second adhesive layer 22 of the bonding portion 20 and further supported by the sealing member 40 and the second adhesive layer 22. Since the second adhesive layer 22 is disposed in parallel with the light control member 30 up to the periphery of the second glass plate 12, the power feeder 50 can readily be disposed in parallel with (substantially on the same plane of) the light control member 30. Further, since the sealing member 40 does not support the power feeder 50, the sealing member 40 can readily be formed.

Fifth Embodiment

Figure 10:
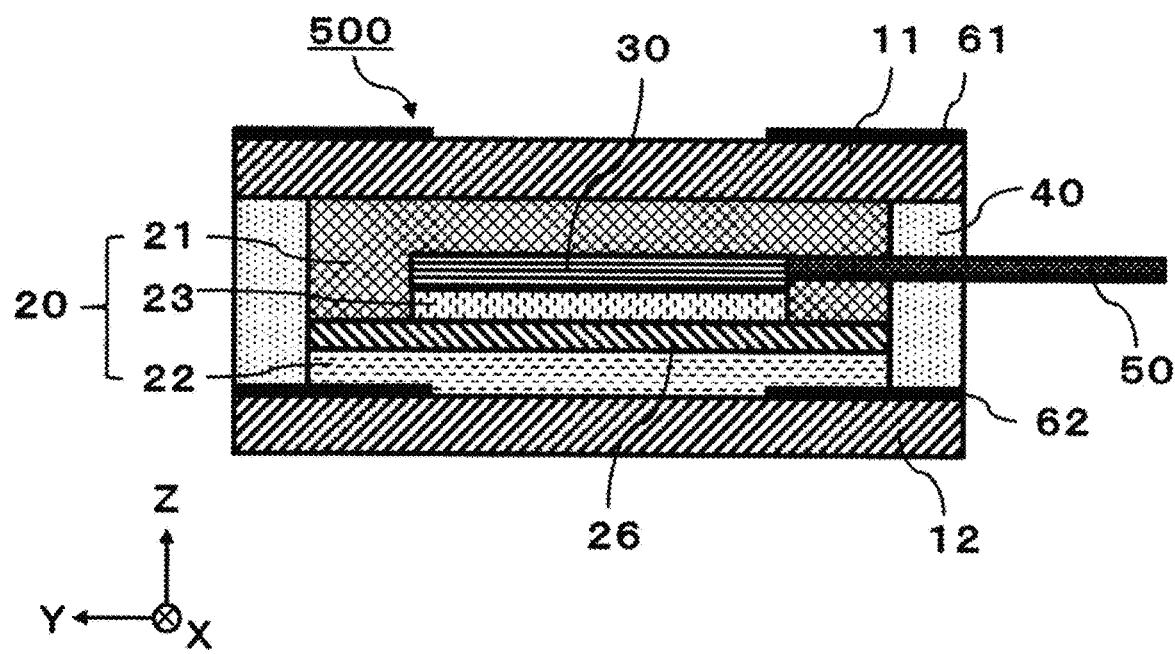
FIG. 10 is a cross sectional view illustrating a laminated glass according to a fifth embodiment.

FIG. 10 is a $Y_1$-$Y_2$ cross sectional view illustrating a laminated glass 500 according to a fifth embodiment. In the present embodiment, points different from the laminated glass 200 according to the second embodiment will be described, and for the other points, descriptions in the second embodiment are incorporated herein. The present embodiment is different from the second embodiment in that the bonding portion 20 has a third adhesive layer 23 between the light control member 30 and the second adhesive layer 22, and there is a resin film 26 between the second adhesive layer 22 and the third adhesive layer 23. And, the power feeder 50 is supported by the first adhesive layer 21 and the sealing member 40. The first adhesive layer 21 is in contact with the first principal surface and all side surfaces of the light control member 30, and the third adhesive layer 23 is in contact with the entire second principal surface of the light control member 30.

The third adhesive layer 23 has either the curable transparent resin or the transparent pressure-sensitive adhesive sheet. The third adhesive layer 23 is disposed between the light control member 30 and the resin film 26 and bond them. In FIG. 10, the third adhesive layer 23 is in contact with only a part of the resin film 26 but may be in contact with the entire surface. The resin film 26 is, for example, a resin film having at least an ultraviolet absorbing function or an ultraviolet reflecting function. Liquid crystal molecules, etc., of the light control device 78 are deteriorated by exposure to ultraviolet rays, and the change of the visible light transmittance of the light control member 30 when the voltage is applied/not applied may decrease. To reduce the deterioration of the light control device 78, the resin film 26 preferably has ultraviolet absorbing function or ultraviolet reflecting function. The resin film 26 may also have an infrared absorbing function or infrared reflecting function.

In FIG. 10, the resin film 26 in in contact with the inner periphery of the sealing member 40. Further, in a plan view, the periphery of the resin film 26 may agree with the periphery of the light control member 30, but is preferably located outside the periphery of the light control member 30. The light control member 30 is protected also from ultraviolet rays turned around e.g. by scattering, and its deterioration can be reduced. The laminated glass 500 has improved impact resistance at the peripheral portion of the light control member 30. Further, the resin film 26 may be disposed so that the periphery of the resin film 26 agrees with the periphery of the second glass plate 12 (the first glass plate 11), as the second adhesive layer 22 according to the fourth embodiment. In such a case, the laminated glass 500 has improved impact resistance as a whole.

In a case where the resin film 26 is not in contact with the inner periphery of the sealing member 40, the first adhesive layer 21 and the second adhesive layer are in contact with each other. Further, the second adhesive layer 22 may not be partly in contact with the sealing member 40 as the laminated glass 300. In such a case, both the first adhesive layer 21 and the second adhesive layer 22 are in contact with the second glass plate 12. In a case where the resin film 26 is not in contact with the inner periphery of the sealing member 40, at the portion where the second adhesive layer 22 is disposed in FIG. 10, the first adhesive layer 21 may be disposed. In such a case, the third adhesive layer 23 may be the second adhesive layer 22.

The laminated glasses 100 to 500 according to the embodiments of the present invention are described with reference to FIGS. 1 to 10. The laminated glasses 100 to 500 may have a polarizing plate, a color filter, a spacer, etc. as the case requires. The spacer is preferably provided on the curable transparent resin portion of the bonding portion 20 and helps to keep at least one of the distance between the first glass plate 11 and the light control member 30 and the distance between the second glass plate 12 and the light control member 30 to be constant.

<Constituting Members>

Now, constituting members contained in the laminated glasses 100 to 500 according to the embodiments of the present invention will be described in further detail. The laminated glasses 100 to 500 are comprehensively described as the laminated glass 100 for simplification, however, descriptions for the following constituting members are applicable also to the laminated glasses 200 to 500. Accordingly, the constituting members are represented by the reference symbols used in FIGS. 1 to 10.

<Glass Plate>

The first glass plate 11 and the second glass plate 12 may be in any shape and may, for example, be in rectangular, trapezoidal or triangular. The first glass plate 11 and the second glass plate 12 may be in a flat plate shape, however, it is preferred that at least one of them is curved, and it is more preferred that both are curved. The first glass plate 11 and the second glass plate 12 may be respectively single curved such that the curved direction is single (cylindrical) or may be double curved in two orthogonal directions.

In the laminated glass 100, the radius of curvature of the first glass plate 11 may be substantially the same as the radius of curvature of the second glass plate 12 (including a case where both are in a flat plate shape), or they may be different from each other. For example, the radius of curvature of the first glass plate 11 may be larger than the radius of curvature of the second glass plate 12. That is, the ratio of the smallest radius of curvature ($R_2$) of the second glass plate 12 to the smallest radius of curvature ($R_1$) of the first glass plate 11, may be $1 \leq R_1/R_2$. In this case, the convex surface of the first glass plate 11 and the concave surface of the second glass plate 12 face each other. On the contrary, in a case where $1 \geq R_1/R_2$, the concave surface of the first glass plate 11 and the convex surface of the second glass plate 12 face each other.

In a case where $R_1$ and $R_2$ are substantially the same, either of the first glass plate 11 and the second glass plate 12 may be disposed on the vehicle interior side/vehicle exterior side. In a case where $R_1$ and $R_2$ are different from each other, in order to prevent the glass plates from being brought into contact with each other to cause distortion, it is preferred that the glass plate corresponding to the larger one among $R_1$ and $R_2$ is disposed on the vehicle interior side and the glass plate corresponding to the smaller one is disposed on the vehicle exterior side. That is, for example, in a case where $R_2<R_1$, it is preferred that the first glass plate 11 is disposed on the vehicle interior side, and the second glass plate 12 is disposed on the vehicle exterior side.

As the first glass plate 11 and the second glass plate 12, conventional known inorganic glass and organic glass used for vehicle window glass may be used. The composition of the first glass plate 11 and the composition of the second glass plate 12 may be the same or different. As inorganic glass, soda lime glass, aluminosilicate glass, borosilicate glass, alkali-free glass, quartz glass and the like may be used without any particular restriction.

The glass plate located on the exterior side of the laminated glass 100 is preferably made of inorganic glass from the viewpoint of scratch resistance, and is preferably made of soda lime glass from the viewpoint of forming property. In a case where the glass plate is made of soda lime glass, clear glass, green glass containing iron contents in a predetermined amount or more, or UV cut green glass may suitably be used. A UV cut green glass plate means ultraviolet absorbing green glass having a $SiO_2$ content of 68 mass % or more and 74 mass % or less, a $Fe_2O_3$ content of 0.3 mass % or more and 1.0 mass % or less, and a FeO content of 0.05 mass % or more and 0.5 mass % or less, an ultraviolet transmittance at a wavelength of 350 nm of 1.5% or less, and having a minimum transmittance in a region of 550 nm or more and 1700 nm or less.

Such glass plates are produced by an optional known method such as float process, fusion method, roll out method or dawn draw method. For bending inorganic glass, gravity forming, pressing or roller forming may, for example, be employed. The glass plate is bent at a temperature of from about 550° C. to about 770° C. Further, the inorganic glass may be non-tempered glass formed by forming molten glass into a plate, followed by annealing, or may be subjected to tempering treatment such as physical tempering (for example air-tempering) or chemical tempering as the case requires.

As organic glass, a transparent resin such as a polycarbonate resin, an acrylic resin, a polystyrene resin, an aromatic polyester resin, a polyester resin, a polyarylate resin, a polycondensate of halogenated bisphenol A and ethylene glycol, an acrylic urethane resin or a halogenated aryl group-containing acrylic resin may be mentioned. As the organic glass, a polycarbonate is preferred, with which a sheet being light in weigh and having flexibility can be obtained. The above resins may be used in combination of two or more.

The first glass plate 11 and the second glass plate 12 are preferably float glass. The float glass is usually preferably soda lime glass, however, alkali free glass may be used, for example, so as to transmit electric waves at a predetermined frequency.

Both inorganic glass and organic glass are usually colorless, but are not limited so long as they are transparent and may be colored. In a case where the glass is colored, it may be so-called privacy glass which has a dark color such as gray. Privacy glass is disclosed in WO2015/088026 in detail, and the contents thereof are incorporated in this specification by reference. Privacy glass has effects to make it difficult to see the vehicle interior from outside the vehicle and to reduce transmission of sunlight from outside the vehicle into inside and to improve aesthetics from inside and outside the vehicle.

Privacy glass is suitably used for windows other than the windshield, particularly for a roof window, a vehicle rear side window, a rear window, etc. Further, inorganic glass and organic glass may have infrared absorbing function and ultraviolet absorbing function.

The thicknesses of the first glass plate 11 and the second glass plate 12 are properly selected depending upon the type, the portion, etc. of the automobile to which the laminated glass 100 is employed, and are usually from 0.1 mm to 10 mm respectively. Now, the thicknesses of the first glass plate 11 and the second glass plate 12 are described assuming that the laminated glass 100 is attached to a vehicle with the first glass plate 11 being deposed on the vehicle interior side and the second glass plate 12 being disposed on the vehicle exterior side. The thickness of a glass plate means the thickness at the thinnest portion if distributed.

The thickness of the first glass plate 11 is preferably 0.3 mm or more in view of flying stone resistance, more preferably 0.5 mm or more, further preferably 0.7 mm or more, particularly preferably 1.1 mm or more, most preferably 1.6 mm or more. Further, in order to suppress the mass of the laminated glass 100, the thickness of the first glass plate 11 is preferably 3 mm or less, more preferably 2.6 mm or less, further preferably 2.1 mm or less.

The same applies to the second glass plate 12, as to the first glass plate 11. The second glass plate 12 may have a composition different from the first glass plate 11. The second glass plate 12 may have a thickness different from the first glass plate 11.

In a case where the first glass plate 11 and the second glass plate 12 have different plate thicknesses, it is preferred that the glass plate located on the vehicle exterior side has a larger plate thickness than the glass plate located on the vehicle interior side, in view of flying stone resistance. The difference between the plate thickness of the first glass plate 11 and the plate thickness of the second glass plate 12 is preferably from 0.3 to 1.5 mm, more preferably from 0.5 mm to 1.3 mm.

On the principle surface of at least one of the first glass plate 11 and the second glass plate 12, a coating film to impart e.g. water repellent function, hydrophilic function, antifouling function, fingerprint preventing function, antifogging function, electrothermal function, infrared absorbing/reflecting function, ultraviolet absorbing/reflecting function, low emission property, low reflection property or coloring may be provided. Such coating films may be used alone or in combination of two or more. Otherwise, instead of a coating film, a film having the same function, property or the like may be bonded to the principal surface of the glass plate.

On the principal surface on the vehicle outermost side when attached to a vehicle, among principal surfaces of the first glass plate 11 and the second glass plate 12, a coating film to impart water repellency function, hydrophilic function or antifouling function is preferably provided. Further, on at least one of the facing principal surfaces (the principal surfaces on the light control member 30 side) of the first glass plate 11 and the second glass plate 12, a coating film to impart electrothermal function, infrared absorbing/reflecting function, ultraviolet absorbing/reflecting function or coloring is preferably provided. Particularly a coating film to impart infrared absorbing/reflecting function or ultraviolet absorbing/reflecting function is preferably provided on a principal surface on the vehicle interior side of the glass plate located on the vehicle exterior side (for example the second glass plate 12). On the principal surface on the vehicle innermost side when attached to a vehicle, among principal surfaces of the first glass plate 11 and the second glass plate 12, a coating film to impart fingerprint preventing function, antifogging function, electrothermal function, infrared absorbing/reflecting function, low emission property, low reflection property or coloring is preferably provided.

<Light-Shielding Portion>

The light-shielding portion 61, 62 is constituted for example as an opaque layer so that it can block visible light to such an extent that at least a portion to be shielded can be shield. For example, the light-shielding portion 61, 62 may be constituted by an organic ink, a colored ceramic, a colored film or the like. The light-shielding portion 61, 62 may be of an optional color such as white, gray, black, blown or dark blue, preferably deep color, more preferably black.

The thickness of the light-shielding portion 61, 62 is not particularly limited and may, for example, be within a range of from 1 μm to 200 μm, preferably from 5 μm to 150 μm. In a case where the light-shielding portion 61, 62 is constituted by an organic ink or a colored ceramic, the thickness of the light-shielding portion 61, 62 is more preferably from 5 μm to 30 μm.

In examples shown in FIGS. 2 to 4 and 6 to 10, the light-shielding portions 61 and 62 are provided at the periphery of the first glass plate 11 and the second glass plate 12 in the laminated glasses 100 to 500, but are not essential. For example, only one of the light-shielding portions 61 and 62 may be provided, or neither of them may be provided.

Further, in examples shown in FIGS. 2 to 4 and 6 to 10, the light-shielding portion 61 is provided on the principal surface (concave surface) of the first glass plate 11 on the opposite side from the light control member 30, and the light-shielding portion 62 is provided on the principal surface (concave surface) of the second glass plate 12 on the light control member 30 side. In such a manner, in a case where the glass plate is curved, the light-shielding portion is provided usually on the concave surface. In other words, when the laminated glass 100 is attached to a vehicle, the light-shielding portion is provided preferably on the principal surface on the vehicle interior side of at least one of the first glass plate 11 and the second glass plate 12.

<Bonding Portion and Adhesive Layer>

The bonding portion 20 contains at least one adhesive layer to bond glass plates. The adhesive layer contains a curable transparent resin or a transparent pressure-sensitive adhesive sheet. As the curable transparent resin and the transparent pressure-sensitive adhesive sheet, an acrylate, silicone, acrylic modified silicone, urethane, urethane acrylate, epoxy, epoxy acrylate, acrylamide or methacrylamide resin composition may be used.

The curable transparent resin is a liquid (before curing) obtained by adjusting the resin composition to have a viscosity with which it is easily dischargeable without adding a solvent. The transparent pressure-sensitive adhesive sheet is a solid (viscoelastic body) obtained by applying the resin composition flatly to a releasable sheet, followed by curing by light or heat.

Such a curable transparent resin and a transparent pressure-sensitive adhesive sheet may be used alone or in combination of two or more. For example, by using an acrylic resin composition and a silicone resin composition in combination, the acrylic resin composition absorbs moisture infiltrating from outside the laminated glass 100 by priority than the silicone resin composition, whereby cloudiness of the silicone resin composition by moisture can be reduced. Thus, aesthetics of the laminated glass 100 tend to be kept over a long time. The transparent pressure-sensitive adhesive sheet includes one having an adhesive provided on both sides of a base sheet and one which is entirely composed of a pressure-sensitive adhesive without having a base sheet.

As the curable transparent resin, from the viewpoint of curing mechanism, any of thermosetting type, photocuring type and room temperature-curable type may be used as cured for bonding glass plates. The curable transparent resin is, from the viewpoint of workability and productivity, preferably a photocuring type or room temperature-curable type, and in that a portion to be shielded such as print can be cured, more preferably a room temperature-curable type.

The photocurable type curable transparent resin is preferably formed of e.g. an acrylate, urethane acrylate or epoxy acrylate resin as a base from the viewpoint of optical transparency and heat resistance. Light used for photocuring may be ultraviolet light or visible light and can be generated, for example, from a metal halide UV lamp, a LED lamp, a high pressure mercury lamp, an electrodeless lamp or a xenon lamp.

The photocurable type curable transparent resin may contain a photopolymerization initiator. The photopolymerization initiator may, for example, be an ultraviolet polymerization initiator or a visible light polymerization initiator. The ultraviolet polymerization initiator may, for example, be a benzoin, benzophenone or acetophenone-based initiator. The visible light polymerization initiator may, for example, be an acylphosphine oxide, thioxanthone, metallocene, quinone or α-aminoalkylphenone-based initiator.

The photocurable type curable transparent resin may contain a silane coupling agent. The silane coupling agent improves adhesion and bonding stability, improves heat resistance and moisture resistance, and improves bonding reliability even when left to stand under severe conditions for a long time.

The room temperature-curable type may be a moisture curable type which is to be cured by reaction with moisture in the air, or a reaction curable type which contains at least two types of resin compositions and which is to be cured by the resin compositions being mixed. The reaction curable type curable transparent resin may, for example, be a two-pack type curable polyorganosiloxane composition disclosed in Japanese Patent No. 5308564 or Japanese Patent No. 5414931.

The curable transparent resin may contain, as the case requires, depending upon the aimed application, additives such as an elastomer, high refractive index organic nanoparticles, an antioxidant, a curing agent, a plasticizer, a filler, an ultraviolet stabilizer, a color matching agent, a reinforcing agent, an antifoaming agent, a surfactant or an anticorrosive. However, depending upon the type of an object to be sealed, the object may be deteriorated by a specific plasticizer, and in such a case, it is preferred to use a resin which contains substantially no such a plasticizer.

The thickness of the bonding portion 20 is preferably 0.5 mm or more at the thinnest portion. When the thickness of the bonding portion 20 at the thinnest portion is 0.5 mm or more, a stress is likely to be dispersed with a small displacement and deformation of the light control member 30 is likely to be suppressed, whereby the bonding portion 20 is less likely to have color shading. Further, impact resistance required as the laminated glass 100 can also be secured. The thickness of the bonding portion 20 is preferably 3 mm or less at the thickest portion. When the thickness of the bonding portion 20 at the thinnest portion is 3 mm or less, the mass of the laminated glass 100 tends not to be too large. The thickness of the bonding portion 20 at the thickest portion is more preferably 2.8 mm or less, further preferably 2.6 mm or less.

The thickness of the bonding portion 20 means the thickness of the bonding portion 20 alone excluding the thickness of the light control member 30. The thinnest portion of the bonding portion 20 means, for example, a portion sandwiching the light control member 30 (a portion overlapping with the light control member 30 in a plan view). The thickest portion of the bonding portion 20 means, for example, a portion not sandwiching the light control member 30 (a portion not overlapping with the light control device 78 in a plan view).

In a case where the bonding portion 20 has the first adhesive layer 21 and the second adhesive layer 22 and the second adhesive layer 22 contains the transparent pressure-sensitive adhesive sheet, the thickness of the second adhesive layer 22 is preferably 1 μm or more at the thinnest portion, in view of handling efficiency. Further, from the viewpoint of impact resistance, the thickness of the second adhesive layer 22 is more preferably 10 μm or more, further preferably 50 μm or more. In order to follow the curved shape of the glass plate, the thickness of the second adhesive layer 22 is preferably 1000 μm or less, more preferably 500

μm or less. The same applies in a case where the first adhesive layer 21 contains the transparent pressure-sensitive adhesive sheet.

The first adhesive layer 21 has a shear modulus at 25° C. of preferably $2.0\times10^5$ Pa or less, more preferably $1.9\times10^5$ Pa or less, further preferably $1.8\times10^5$ Pa or less. When the first adhesive layer 21 has a shear modulus at 25° C. of $2.0\times10^5$ Pa or less, a stress is likely to be dispersed with a small displacement and deformation of the light control member 30 is likely to be suppressed, whereby color shading is less likely to occur.

Further, the first adhesive layer 21 has a shear modulus at 25° C. of preferably $1.0\times10^3$ Pa or more, more preferably $5.0\times10^3$ Pa or more, further preferably $1.0\times10^4$ Pa or more. When the first adhesive layer 21 has a shear modulus at 25° C. of $1.0\times10^3$ Pa or more, wrinkles which may cause color shading are less likely to form at the time of handling. The same applies to the second adhesive layer 22. In a case where the bonding portion 20 has a plurality of adhesive layers, an adhesive layer having the maximum shear modulus preferably has the shear modulus within the above range.

Further, the first adhesive layer 21 preferably has tanδ at 25° C. of 0.1 or more, whereby high adhesion will be obtained. Further, the first adhesive layer 21 preferably has tanδ at 25° C. of 1.0 or less, whereby shear separation can be reduced. The same applies to the second adhesive layer 22. The shear modulus and tanδ in this specification may be measured by subjecting a sample to dynamic viscoelasticity test by shear method at a frequency of 1 Hz for example by MCR301 manufactured by Anton Paar.

The bonding portion 20 (specifically the adhesive layer contained in the bonding portion 20) may further contain a coloring agent, an infrared absorber, an ultraviolet absorber, a light-emitting agent or the like. When the laminated glass 100 is attached to a vehicle, the bonding portion 20 preferably contains at least an ultraviolet absorber at a portion located on the vehicle exterior side than the light control member 30. By the bonding portion 20 containing an ultraviolet absorber, the laminated glass 100 tends to keep the visible light transmittance even when used for a long time. That is, by the bonding portion 20 containing an ultraviolet absorber, the weather resistance of the laminated glass 100 will improve. Further, the bonding portion 20 may have a colored portion called shade band. In a case where the bonding portion 20 contains an ultraviolet absorber, the ultraviolet transmittance of the bonding portion 20 is preferably 20% or less. Further, at least one of the first adhesive layer 21 and the second adhesive layer 22 preferably has an ultraviolet transmittance of 20% or less.

The bonding portion 20 has a visible light transmittance measured in accordance with JIS K7361-1:1997 of preferably 70% or more, more preferably 80% or more. Further, the bonding portion 20 has a yellowness calculated in accordance with JIS K7373:2006 of preferably 30 or less, more preferably 20 or less. Further, a value obtained by dividing the yellowness calculated in accordance with JIS K7373:2006 by the thickness (μm) of the bonding portion 20 at the thickest portion is preferably 0.04 $\mu m^{-1}$ or less, more preferably 0.03 $\mu m^{-1}$ or less.

<Ultraviolet Absorber>

In order to reduce deterioration of the light control member 30 (the light control device 78) by ultraviolet light and to keep the light transmitting/light shielding performance of the light control member 30, at least one of members located on the vehicle exterior side than the light control device 78 preferably has ultraviolet absorbing function. At least one of the first glass plate 11, the second glass plate 12, the bonding portion 20, the resin film 26, the first substrate 71 and the second substrate 72 of the light control device preferably has ultraviolet absorbing function. These members have ultraviolet absorbing function when they contain an ultraviolet absorber in their interior. Further, these member have ultraviolet absorbing function when they have a coating film containing an ultraviolet absorber on their surface. It is preferred that the transmittance for ultraviolet light which enters from one of the glass plates of the laminated glass 100 to be transmitted through the light control member 30 and is given off from the other glass plate, is preferably 0% or more and 20% or less. The wavelength of the ultraviolet light may, for example, be from 250 nm to 380 nm and may include at least 380 nm. When the ultraviolet light transmittance is 20% or less, deterioration of the light control device 78 tends to be reduced, and light transmitting/light shielding performance of the light control member 30 is likely to be kept. The ultraviolet light transmittance is more preferably less than 20%, further preferably less than 10%.

As the ultraviolet absorber, a known one may be used, and two or more ultraviolet absorbers may be used in combination. The ultraviolet absorber may, for example, be a benzophenone compound, a benzotriazole compound, a triazine compound, an azomethine compound, an indole compound, a dibenzoyl resorcinol derivative, a benzodithiol compound or an oxazolone compound.

The benzophenone compound may, for example, be 2-hydroxy-4-(2-methacryloyloxyethoxy)benzophenone, 2-hydroxy-4-(4-methacryloyloxybutoxy)benzophenone, 2,2'-dihydroxy-4-(2-methacryloyloxyethoxy)benzophenone, 2,4-dihydroxy-4'-(2-methacryloyloxyethoxy)benzophenone, 2,2',4-trihydroxy-4'-(2-methacryloyloxyethoxy)benzophenone, 2-hydroxy-4-(3-methacryloyloxy hydroxypropoxy) benzophenone, or 2-hydroxy-4-(3-methacryloyloxy hydroxypropoxy)benzophenone.

The benzotriazole compound may, for example, be 2-(2-hydroxy-5-methacryloyloxyphenyl)-2H-benzotriazole, 2-(2-hydroxy-3-tert-butyl-5-methacryloyloxymethylphenyl)-2H-benzotriazole, 2-[2-hydroxy-5-(2-methacryloyloxyethyl)phenyl]-2H-benzotriazole, 2-[2-hydroxy-3-tert-butyl-5-(2-methacryloyloxyethyl)phenyl]-5-chloro-2H-benzotriazole, or 2-[2-hydroxy-3-methyl-5-(8-methacryloyloxyoctyl)phenyl]-2H-benzotriazole.

The triazine compound may, for example, be 6-methyl-heptyl 2-[4-(4,6-bis-biphenyl-4-yl-[1,3,5]triazin-2-yl)-3-hydroxy-phenoxy]-propionate, 6-methyl-heptyl 2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionate, a reaction product of 2-(4,6-bis(2,4-dimethylphenyl)-1,3,5-triazin-2-yl)-5-hydroxyphenyl and oxirane, 2,4-bis[2-hydroxy-4-butoxyphenyl]-6-(2,4-dibutoxyphenyl)-1,3,5-triazine, or a reaction product of 2-(2,4-dihydroxyphenyl)-4,6-bis(2,4-dimethylphenyl)-1,3,5-triazine and (2-ethylhexyl)-glycidate.

The azomethine compound may, for example, be BONASORB UA-3701 (tradename, manufactured by ORIENT CHEMICAL INDUSTRIES CO., LTD.). The indole compound may, for example, be BONASORB UA-3911 (tradename, manufactured by ORIENT CHEMICAL INDUSTRIES CO., LTD.). The dibenzoyl resorcinol derivative may, for example, be 4,6-dibenzoyl resorcinol.

The benzodithiol compound may, for example, be 2-(4, 7-dihydroxy-1,3-benzodithiol-2-ylidene)-4,4-dimethyl-3-oxopentanenitrile, 2-cyano-2-(4,7-dihydroxy-1,3-benzodithiol-2-ylidene)-2-ethylhexyl acetate, 2-(4,7-dihydroxy-1,3-benzodithiol-2-ylidene)propanedinitrile, 1,2-dibutyl-4-(4,7- dihydroxy-1,3-benzodithiol-2-ylidene)-3,5-pyrazolidinedione, 4-(4,7-dihydroxy-1,3-benzodithiol-2-ylidene)-3-(1,1-dimethylester)-5(4H)-isoxazolone, 4-(4,7-dihydroxy-1,3-benzodithiol-2-ylidene)-1,2-diphenyl-3,5-pyrazolidinedione, 2-(4,7-dihydroxy-5-methyl-1,3-benzodithiol-2-ylidene)propanedinitrile, 2,2'-(4,8-dihydroxybenzo[1,2-d:4,5-d']bis[1,3]dithiol-2,6-diylidene)bis[4,4-dimethyl oxopentanenitrile], 2,2'-(4,8-dihydroxybenzo[1,2-d:4,5-d']bis[1,3]dithiol-2,6-diylidene)bis[2-cyano-1,1'-bis(2-ethylhexyl) acetate], 4,4'-(4,8-dihydroxybenzo[1,2-d:4,5-d']bis[1,3]dithiol-2,6-diylidene)bis[2,4-hidhydro-5-methyl-2-phenyl-3H-pyrazol-3-one].

In view of excellent compatibility with the curable transparent resin or the transparent pressure-sensitive adhesive sheet, the ultraviolet absorber is preferably a benzotriazole compound or a benzophenone compound, more preferably a benzotriazole compound. As a commercial benzotriazole compound, for example, Tinuvin 384-2, Tinuvin 326, Tinuvin 970, etc. manufactured by BASF may be mentioned, which are excellent in compatibility with the curable transparent resin. For example, even an ultraviolet absorber having low compatibility with a predetermine curable transparent resin can have improved compatibility with the ultraviolet absorber by being modified to be bonded to a moiety having high compatibility to the curable transparent resin matrix, whereby a wide range of ultraviolet absorbers may be used. That is, for example, for a silicone curable transparent resin, a silicone-modified ultraviolet absorber can suitably be used.

<Resin Film>

The resin film 26 may be a dielectric multilayer film having PET films or a plurality of resin films differing in the refractive index laminated. The total thickness of the resin film 26 may be from 25 μm to 200 μm for example. The resin film 26 may have an infrared reflecting film having a film thickness of from about 100 nm to about 500 nm on its surface. As the infrared reflecting film, a single layer or multilayer infrared reflecting film containing a dielectric multilayer film, a liquid crystal alignment film, an infrared reflector-containing coating film or a metal film may, for example, be mentioned.

<Light Control Member and Light Control Device>

The light control member 30 is a device capable of changing the light transmittance of the laminated glasses 100 to 500. The light control member 30 may, for example, be in a sheet form. The thickness of the light control member 30 is, for example, from 0.05 mm to 2.9 mm, preferably from 0.05 mm to 2.0 mm, more preferably from 0.1 mm to 1.0 mm. The light control member 30 has maximum dimensions within a range of from 300 mm to 3,000 mm. The "maximum dimensions" mean the longest size of the light control member 30 in a plan view of the first glass plate 11.

The light control device 78 may, for example, be in a sheet form. And, the light control device 78 is located between the first substrate 71 on which the first conductive layer 75 is formed and the second substrate 72 on which the second conductive layer 76 is formed.

The light control device 78 is selected, for example, from a group consisting of a suspended particle device (SPD), a twisted nematic liquid crystal (TNLC), a polymer dispersed liquid crystal (PDLC), a polymer network liquid crystal (PNLC), a guest host liquid crystal (GHLC), a photochromic, an electrochromic and an electrokinetic.

The present invention is particularly effective in a case where the light control device 78 has at least one member selected from the group consisting of TNLC, PDLC, PNLC and GHLC, with which color shading due to uneven distribution of liquid crystal tends to occur. Further, the present invention is further effective in a case where the light control device 78 has GHLC with which the interior of the light control device 78 is in a liquid state and the light control device 78 is susceptible to even slight uneven distribution of the liquid crystal.

Further, the rotational viscosity (γ1) at 25° C. of the light control device 78 is preferably 2000 mPa·s or less. As the light control device 78 of which the rotational viscosity (γ1) at 25° C. is 2000 mPa·s or less, for example, GHLC may be mentioned. The rotational viscosity at 25° C. of the light control device 78 is more preferably 1000 mPa·s or less, further preferably 750 mPa·s or less, particularly preferably 500 mPa·s or less. When the rotational viscosity (γ1) at 25° C. of the light control device 78 is 1000 mPa·s or less, the response speed can be further high. Further, when the rotational viscosity at 25° C. of the light control device 78 is 10 mPa·s or more, the light control member 30 and the laminated glasses 100 to 500 can more readily be produced. The rotational viscosity may be measured by using a parallel circular rotating viscometer (B type viscometer).

At a portion of the laminated glasses 100 to 500 having the light control member 30, the difference in the visible light transmittance (Tv) between the dark state and the light state is preferably 3% or more, more preferably 35% or more, further preferably 50% or more, particularly preferably 80% or more. Tv may be measured in accordance with JIS R3212:2015.

<Substrate>

The first substrate 71 is constituted, for example, by a transparent resin. The first substrate 71 contains, for example, at least one member selected from the group consisting of polyethylene terephthalate (PET), polyethylene naphthalate (PEN), polyamide, polyether, polysulfone, polyether sulfone, polycarbonate (PC), polyarylate, polyetherimide, polyether ether ketone, polyimide, aramid, polybutylene terephthalate (PBT), triacetyl cellulose, polyurethane and a cycloolefin polymer.

The first substrate 71 preferably has at least one member selected from the group consisting of polyethylene terephthalate, polycarbonate and a cycloolefin polymer, and is preferably constituted by any of them.

The thickness of the first substrate 71 is, for example, from 5 μm to 500 μm, preferably from 10 μm to 200 μm, more preferably from 50 μm to 150 μm.

The same applies to the second substrate 72 as to the first substrate 71. The second substrate 72 may be constituted by a material different from the first substrate 71. Further, the second substrate 72 may have a thickness different from the first substrate 71.

<Conductive Layer>

For the first conductive layer 75, for example, a transparent conducive oxide (TCO) may be used. As TCO, for example, tin-doped indium oxide (ITO), aluminum-doped zinc oxide (AZO) or indium-doped cadmium oxide may, for example, be mentioned, but TCO is not limited thereto.

For the first conductive layer 75, a transparent conductive polymer such as poly (3,4-ethylenedioxythiophene) (PEDOT) or poly(4,4-dioctylcyclopentadithiophene) may also be suitably used. Further, for the first conductive layer 75, a laminated film of a metal layer and a dielectric layer, a silver nanowire or a silver or copper metal mesh may also be suitably used.

The first conductive layer 75 may be formed, for example, by a physical vapor deposition (PVD) method such as sputtering method, vacuum deposition method or ion plating method. Otherwise, the first conductive layer 75 may be formed by a chemical vapor deposition method (CVD) or a wet coating method.

The thickness of the first conductive layer 75 is not particularly limited and may, for example, be within a range of from 200 nm to 2 µm. The same applies to the second conductive layer 76 as to the first conductive layer 75. However, the second conductive layer 76 may be constituted by a material different from the first conductive layer 75. Further, the second conductive layer 76 may have a thickness different from the first conductive layer 75.

<Power Feeder>

The power feeder 50 is located, for example, at a position overlapping with the light-shielding portion 61, 62 in a plan view, as shown in FIGS. 3, 4, 9 and 10. The power feeder 50 is inserted between the first conductive layer 75 and the second conductive layer 76 and is electrically connected therewith. The power feeder 50 applies a voltage from an exterior device to the conductive layer. In the example shown in FIG. 1, the power feeder 50 is located on the long side of the laminated glass 100, but the position of the power feeder 50 is not limited thereto and is optional and may be on the short side for example. Further, two or more power feeders 50 may be disposed, and they may be disposed on the same side, may be disposed on two facing sides to face each other, or may be disposed on adjacent sides.

For the power feeder 50, in view of the cost and availability, a metal foil or metal wire covered with an insulating member, or a flexible strip connecting member such as FPC (flexible printed circuit) may suitably be used. The metal foil and the metal wire preferably contain gold, silver or copper for example, more preferably copper. Carbon may be used instead of such a metal.

The power feeder 50 can be bonded to the first conductive layer 75 and the second conductive layer 76 of the light control member 30 by any of e.g. a conductive pressure-sensitive adhesive material (conductive adhesive layer), an anisotropic conductive film and soldering. Further, the power feeder 50 may directly be brought into contact with the first conductive layer 75 and the second conductive layer 76 without via a conductive pressure-sensitive adhesive material, an anisotropic conductive film or soldering.

The insulating member may be a thermosetting resin or a thermoplastic resin. For example, it may be a polyester resin such as PET, PEN or PBT, a polyamide resin such as nylon 6, nylon 66 or nylon 610, a polyimide resin such as a polyimide, a polyamide imide or a polyether imide, or a resin such as a fluorinated resin, a polyether sulfone, a polyether ketone, a polyether sulfide, a polyarylate, a polyester ether, a wholly aromatic polyamide, a polyaramid, a polypropylene (PP), PC, or a liquid crystal polymer. Among them, a polyimide resin such as a polyimide may suitably be used.

The thickness of the power feeder 50 is preferably from 0.05 mm to 0.4 mm. The thickness of the power feeder 50 is preferably 0.05 mm or more, more preferably 0.1 mm or more, to secure sufficient strength and to suppress drawbacks such as breaking of wire. Further, the thickness of the power feeder 50 is preferably 0.4 mm or less so as to reduce generation of bubbles around the power feeder 50.

<Sealing Member>

The sealing member 40 prevents the bonding portion 20 from protruding from the periphery of the first glass plate 11 and the second glass plate 12 at the time of bonding the first glass plate 11 and the second glass plate 12. The sealing member 40 may be an optional curable transparent resin which can be used for the bonding portion 20, and is preferably a photocurable type curable transparent resin. Since the sealing member 40 can be shielded by providing the light-shielding portion on at least one of the first glass plate 11 and the second glass plate 12, the sealing member 40 may not be transparent.

The shear modulus at 25° C. of the sealing member 40 is preferably the same as or higher than the shear modulus at 25° C. of the bonding portion 20. The shear modulus may be measured under the above conditions.

In a plan view of the first glass plate 11, the width of the sealing member 40 may be 0.05 mm or more from the periphery of the first glass plate 11, preferably 0.1 mm or more, more preferably 0.2 mm or more. Further, the width of the sealing member 40 may be 10 mm or less.

(Method for Producing Laminated Glass According to an Embodiment of the Present Invention)

Figure 11:
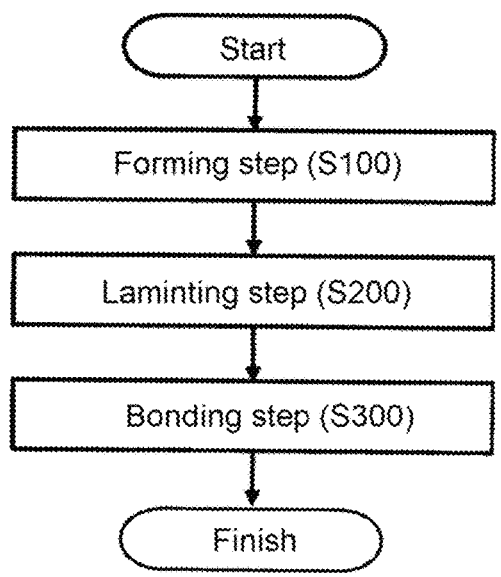
FIG. 11 is a flow chart illustrating a process for preparing a laminated glass according to the present invention.

Now, an example of the method for producing a laminated glass according to an embodiment of the present invention will be described. FIG. 11 schematically illustrates the flow of the method for producing a laminated glass according to an embodiment of the present invention.

As shown in FIG. 11, the method for producing a laminated glass according to an embodiment of the present invention comprises (1) a forming step (step S100) of forming the sealing member on at least a part of the periphery of at least one of the first glass plate and the second glass plate in a plan view and forming a bonding portion containing a curable transparent resin on a principal surface of at least one of the first glass plate and the second glass plate, (2) a laminating step (step S200) of forming a laminate in which the first glass plate, the bonding portion and the second glass plate are laminated in this order, and the bonding portion is in contact with the first glass plate, the second glass plate, and a first principal surface, a second principal surface and side surfaces of a light control member to which a power feeder is connected, and (3) a bonding step (step S300) of bonding the first glass plate, the bonding portion, the second glass plate and the sealing member with one another in the laminate.

Now, the respective steps will be described below. The respective members will be represented by the Reference Symbols shown in FIGS. 1 to 10.

The step S100 is a step of forming the sealing member and the bonding portion. The sealing member 40 is formed an at least a part of the periphery of at least one of the first glass plate and the second glass plate in a plan view. The sealing member 40 may have the curable transparent resin or may have the pressure-sensitive adhesive transparent sheet. In a case where the sealing member 40 has a curable transparent resin, the curable transparent resin before curing is charged in a known discharge apparatus such as a glue gun to form the sealing member 40. And, the curable transparent resin is cured by a curing method depending upon the type of the curable transparent resin. In a case where the sealing member 40 has a pressure-sensitive adhesive transparent sheet, a continuous frame-shaped pressure-sensitive adhesive transparent sheet is prepared to form the sealing member 40. Otherwise, a plurality of strip pressure-sensitive adhesive transparent sheets may be combined to form the sealing member 40.

The sealing member 40 may be formed directly on the principal surface of at least one of the first glass plate and the second glass plate. "Formed directly on the principal surface" includes a case where the sealing member is formed on the light-shielding portion or the coating film formed on the principal surface of the glass plate as the case requires. Further, the sealing member 40 may be formed on the principal surface of at least one of the first glass plate and the second glass plate via an adhesive layer forming the bonding portion (for example the second adhesive layer 22 or the third adhesive layer 23), the resin film 26 or the like. Here, the sealing member 40 is formed before the adhesive layer having the curable transparent resin is formed.

The bonding portion 20 has the curable transparent resin and is directly formed on the principal surface of at least one of the first glass plate and the second glass plate. In a case where the bonding portion 20 has a single adhesive layer having the curable transparent resin (that is the first adhesive layer 21), the first adhesive layer 21 may be formed by charging the curable transparent resin before curing into a known discharge apparatus such as a glue gun and discharging the resin in an amount constituting the bonding portion 20 into a region surrounded by the sealing member 40. The first adhesive layer 21 may be formed step by step. For example, the curable transparent resin before curing in an amount smaller than the amount to constitute the bonding portion 20 may be discharged, and the light control member 30 having the power feeder 50 preliminarily connected is left at rest, and then the resin is re-discharged until the amount charged reaches the amount to constitute the bonding portion 20. In such a case, the sealing member 40 may also be formed step by step.

In a case where the bonding portion 20 has two or more adhesive layers (for example, in a case where the bonding portion 20 has the first adhesive layer 21, the second adhesive layer 22 and the third adhesive layer 23), the respective adhesive layers may be formed in an optional order. For example, the sealing member 40 may be formed on the periphery of the first glass plate 11 (the second glass plate 12), then a region surrounded by the sealing member 40 is filled with the curable transparent resin, whereby the first adhesive layer 21 (the second adhesive layer 22) can be formed. Or, the third adhesive layer 23 having the pressure-sensitive adhesive transparent sheet may be formed on the second principal surface of the light control member 30. As the adhesive layer having the pressure-sensitive adhesive transparent layer, a known pressure-sensitive adhesive transparent sheet adjusted to have a desired size may be used.

The step S200 is a laminating step of forming a laminate. The laminate is a laminate having the first glass plate 11, the bonding portion 20 and the second glass plate 12 laminated in this order. In a case where the bonding portion 20 is formed directly or indirectly on the principal surface of either one of the first glass plate 11 and the second glass plate 12, the other glass plate is laminated on the bonding portion 20. In a case where the bonding portion 20 is partially formed directly or indirectly on the principal surface of both the first glass plate 11 and the second glass plate 12, the two glass plates are laminated so that the partially formed bonding portions are united. In either case, the laminate is formed so that the first principal surface, the second principal surface and side surfaces (that is the whole surface) of the light control member 30 are in contact with the bonding portion 20. Needless to say, a pressure is somewhat applied to the light control member 30 at the time of lamination, however, lamination is possible without application of a local pressure to such an extent that the light control member 30 is deformed to cause color shading. Thus, in the subsequent step S300, the bonding portion 20 is less likely to flow, and a local pressure to deform the light control member 30 is less likely to be applied, and thus color shading can be reduced. The step S200 may be carried out under reduced pressure or under atmospheric pressure.

The step S300 is a step of bonding constituting members of the laminate, and is carried out specifically by curing the curable transparent resin. The step S300 is carried out under mild conditions at lower temperature under lower pressure than in the autoclave treatment in the step for producing the laminated glass having a thermoplastic interlayer, to reduce color shading. The step S300 may also be conducted under reduced pressure or under atmospheric pressure. However, in a case where bubbles remain in the interior of the laminate, the laminate may be heated/pressurized to remove the bubbles before curing or after curing the curable transparent resin. In the step S300, the absolute pressure applied to the bonding portion may be less than 0.5 MPa, and the temperature applied to the bonding portion may be less than 120° C.

In a case where the curable transparent resin is room temperature curable type, the laminate is left at rest for a predetermined time. While the laminate is left at rest, the bonding portion 20 is pressurized at least in an amount corresponding to the weight of the first glass plate 11 itself, and it may be pressurized at least under an absolute pressure of less than 0.5 MPa. The temperature at the time when the laminate is left at rest is not limited and is preferably room temperature. In a case where the curable transparent resin is thermosetting type, it may be heated at a temperature lower than the autoclave treatment temperature. Specifically, the temperature may be less than 120° C., and is preferably 115° C. or less, whereby color shading is likely to be reduced, more preferably 110° C. or less, further preferably 100° C. or less, still more preferably less than 100° C., particularly preferably 90° C. or less, most preferably 80° C. or less. In a case where the curable transparent resin is photocurable type, predetermined light to cure the curable transparent resin may be applied. The temperature is not limited and is preferably room temperature.

EXAMPLES

Now, the present invention will be described in detail with reference to Examples. However, it should be understood that the present invention is by no means restricted thereto. Laminated glasses having constitutions in Ex. 1 to 7 were prepared. Ex. 1 to 6 are Examples of the present invention, and Ex. 7 is a Comparative Example.

Ex. 1

Ex. 1 is an example corresponding to the laminated glass 100 according to the first embodiment. As the first glass plate 11 and the second glass plate 12, double curved soda lime glass having a quadrangular shape of 300 mm×300 mm×2 mm in thickness was used. The transmittances for 380 nm ultraviolet light of the first glass plate 11 and the second glass plate 12 were respectively 75%. As the sealing member 40, a thermosetting type silicone curable transparent resin (manufactured by Momentive, "OP1912") was used. As the bonding portion 20 (the first adhesive layer 21), a reaction curable type silicone curable transparent resin (manufactured by Momentive, "SN1001") (no ultraviolet absorber used) was used. As the light control member 30, GHLC light control film of 80 mm×80 mm×0.4 mm in thickness was used. Now, a process for preparing the laminated glass in Ex. 1 having a convex surface of the first glass plate 11 and a concave surface of the second glass plate 12 facing each other is shown.

First, on the periphery of the second glass plate 12, a 1 mm width sealing member 40 was provided. A heat of 40° C. to 80° C. was applied for 30 minutes to cure the thermosetting type curable transparent resin to constitute the sealing member 40. Then, on the principal surface of the second glass plate 12, a predetermined amount of a mixture of agent A and agent B was discharged from a mixing nozzle to provide the reaction curable type curable transparent resin to constitute the first adhesive layer 21 in a predetermined thickness. Then, on the curable transparent resin, on a center of the second glass plate 12 in a plan view, the light control member 30 having the power feeder 50 connected was disposed.

Then, an uncured sealing member was further provided on the cured sealing member so that the power feeder 50 was supported by the sealing member 40, and the uncured sealing member was cured at from 40° C. to 80° C. Then, on the light control member 30 and the power feeder 50, the same reaction curable type curable transparent resin was charged to from the bonding portion 20 so that the first principal surface, the second principal surface and side surfaces (that is the whole surface) of the light control member 30 were in contact with the curable transparent resin. Then, the first glass plate 11 was laminated to be in contact with the sealing member 40 and the bonding portion 20, and in a state where the bonding portion 20 was pressurized under a pressure corresponding to the weight of the first glass plate 11 itself, the assembly was left at rest until the reaction curable type curable transparent resin was cured, to obtain a laminated glass in Ex. 1.

(Ex. 2)

Ex. 2 is an example corresponding to the laminated glass 100 according to the first embodiment. Ex. 2 is different from Ex. 1 in that an ultraviolet absorber was added to the curable transparent resin, and is the same as Ex. 1 except for this. As the ultraviolet absorber, Tinuvin384-2 was used. The ultraviolet absorber was dissolved in the reaction curable type curable transparent resin (SN1001) as the agent A, and a mixture of the agent B was further dissolved by stirring under heating at 60° C.

(Ex. 3)

Ex. 3 is an example corresponding to the laminated glass 100 according to the first embodiment. Ex. 3 is different from Ex. 1 in that the ultraviolet absorber was added to the curable transparent resin, and is the same as Ex. 1 except for this. As the ultraviolet absorber, a compound having 1,2-dibutyl-4-(4,7-dihydroxy-1,3-benzodithiol-2-ylidene)-3,5-pyrazolidinedione silicone-modified with an epoxy-modified silicone (manufactured by Shin-Etsu Chemical Co., Ltd., "KF-105") and an amine catalyst by stirring with heating at 80° C., was used. That is, a silicone modified ultraviolet absorber was used. The silicone-modified ultraviolet absorber was dissolved in the reaction curable type silicone curable transparent resin (SN1001) as the agent A, and a mixture of the agent B was further dissolved by stirring with heating at 60° C.

(Ex. 4)

Ex. 4 is an example corresponding to the laminated glass 100 according to the first embodiment. Ex. 4 is different from Ex. 1 in that on the principal surface on the side facing the light control member 30 of the second glass plate 12, un ultraviolet absorbing coating film containing Tinuvin 384-2 as the main component was formed, and is the same as in Ex. 1 except for this. The ultraviolet absorbing coating film was provided before the step of forming the sealing member 40.

(Ex. 5)

Ex. 5 is an example corresponding to the laminated glass 400 according to the fourth embodiment. It is different from Ex. 1 in the following point, and is the same as Ex. 1 except for this. That is, as the first adhesive layer 21, the reaction curable type curable transparent resin (no ultraviolet absorber used) the preparation method of which was shown above was used, and as the second adhesive layer 22, an acrylic transparent pressure-sensitive adhesive sheet (manufactured by PANAC CO., LTD., "PDS1") of 300 mm×300 mm×50 μm in thickness was used.

First, on the principal surface of the second glass plate 12, the second adhesive layer 22 and, at the center of the second glass plate 12 in a plan view, the light control member 30 having the power feeder 50 connected, were disposed. Then, on the periphery of the second adhesive layer 22, a 1 mm width sealing member 40 was provided. Then, the first adhesive layer 21 was disposed so that the first principal surface, the second principal surface and side surfaces (that is the whole surface) of the light control member 30 were in contact with the curable transparent resin, to form the bonding portion 20. The subsequent steps were the same as in Ex. 1. A laminated glass in Ex. 5 was obtained in such a manner.

(Ex. 6)

Ex. 6 is an example corresponding to the laminated glass 400 according to the fourth embodiment. Ex. 6 is different in that as the second adhesive layer 22, an acrylic transparent pressure-sensitive adhesive sheet (manufactured by GUNZE LIMITED, "NNEAOM" containing a benzotriazole ultraviolet absorber was used, and is the same as Ex. 5 except for this. The ultraviolet absorber was applied before the second adhesive layer 22 was disposed.

(Ex. 7)

In Ex. 7, two PVB interlayers (manufactured by Eastman Chemical) of 300 mm×300 mm×0.76 mm in thickness were used, without using the sealing member 40 and the bonding portion 20. Ex. 7 is the same as Ex. 1 except for this.

First, on the principal surface of the second glass plate 12, two PVB interlayers having the light control member 30 sandwiched therebetween were laminated, so that the light control member 30 was at the center of the second glass plate 12 in a plan view. Further, the first glass plate 11 was laminated so as to be in contact with the PVB interlayers to obtain a laminate. The obtained laminate was put in a rubber bag and subjected to primary bonding while the temperature inside the rubber bag was controlled at from 100° C. to 140° C. and the absolute pressure from 0.01 MPa to 0.1 MPa. Then, the laminate was subjected to secondary bonding in an autoclave while the temperature was controlled to be from 120° C. to 140° C. and the absolute pressure from 0.5 MPa to 1.4 MPa to obtain a laminated glass in Ex. 7.

Color shading and weather resistance of each of the laminated glasses in Ex. 1 to 7 were evaluated. The constitution and the evaluation results of each of the laminated glasses are shown in Table 1.

[Evaluation of Color Shading]

While the light control member 30 was in a dark state, the laminated glass was visually observed from the first glass plate 11 side to evaluate the color shading. A case where color shading was confirmed on the entire light control member 30 was rated as "C", a case where color shading was partly confirmed on the light control member 30 as "B", and a case where no color shading was confirmed on the light control member 30 as "A".

[Evaluation of Ultraviolet Transmittance]

Ultraviolet light having a wavelength of 380 nm was made to enter from one of the first glass plate 11 and the second glass plate 12, to be transmitted through the light control member 30 and be given from the other glass plate, and the transmittance for the given ultraviolet light having a wavelength of 380 nm was measured.

[Evaluation of Weather Resistance]

To evaluate deterioration of the light control member 30 by ultraviolet light, evaluation of weather resistance was conducted. Using a xenon weather meter, the laminated glass was exposed at a black panel temperature of 83° C. with an amount of irradiation of 150 W for 1500 hours, and then the visible light transmittance (Tv) in a dark state was measured. Measurement of Tv was conducted in accordance with JIS R3212:2015 using UH4150, illuminant A manufactured by Hitachi High-Tech Corporation. A case where the absolute value of the change of the visible light transmittance of the laminated glass as between before and after the test is 1.5% or less, is rated as "AA", a case where it is 2.0% or less as "A", and a case where it is more than 2.0% and 5.0% or less as "B".

TABLE 1

|  | Ex. 1 | Ex. 2 | Ex. 3 | Ex. 4 |
|---|---|---|---|---|
| First glass plate | Soda lime glass | Soda lime glass | Soda lime glass | Soda lime glass |
| First adhesive layer | Curable transparent resin | Curable transparent resin | Curable transparent resin | Curable transparent resin |
| Ultraviolet absorber | Not added | Added | Added | Not added |
| Light control member | GHLC | GHLC | GHLC | GHLC |
| Second adhesive layer | Nil | Nil | Nil | Nil |
| Ultraviolet absorber | — | — | — | — |
| Second glass plate | Soda lime glass | Soda lime glass | Soda lime glass | Soda lime glass |
| Ultraviolet absorbing coating film | Nil | Nil | Nil | Formed |
| Color shading | A | A | A | A |
| Ultraviolet transmittance | >20% | <20% | <10% | <20% |
| Weather resistance | B | A | AA | A |

|  | Ex. 5 | Ex. 6 | Ex. 7 |
|---|---|---|---|
| First glass plate | Soda lime glass | Soda lime glass | Soda lime glass |
| First adhesive layer | Curable transparent resin | Curable transparent resin | PVB |
| Ultraviolet absorber | Not added | Not added | Not added |
| Light control member | GHLC | GHLC | GHLC |
| Second adhesive layer | Transparent pressure-sensitive adhesive sheet | Transparent pressure-sensitive adhesive sheet | PVB |
| Ultraviolet absorber | Not added | Added | Not added |
| Second glass plate | Soda lime glass | Soda lime glass | Soda lime glass |
| Ultraviolet absorbing coating film | Nil | Nil | Nil |
| Color shading | A | A | C |
| Ultraviolet transmittance | >20% | <20% | >20% |
| Weather resistance | B | A | B |

It is found from Table 1 that in the laminated glass having the light control member, when the bonding portion 20 has the curable transparent resin, color shading can be reduced. Further, it is found that in the laminated glass having the light control member, when an ultraviolet absorber is contained, weather resistance improves. Especially by using a silicone-modified ultraviolet absorber, weather resistance further improved. Further, when a second adhesive layer (acrylic transparent pressure-sensitive adhesive sheet) is contained in addition to the first adhesive layer, position of the light control member relative to the glass substrate was less likely to be slipped.

REFERENCE SYMBOLS

100: laminated glass
11: first glass plate
12: second glass plate
20: bonding portion
21: first adhesive layer
22: second adhesive layer
26: resin film
30: light control member
40: sealing member
50: power feeder
60: light-shielding portion
71: first substrate
72: second substrate
75: first conductive layer
76: second conductive layer
78: light control device
79: sealing material
G: center of gravity
S: space

What is claimed is:

1. A laminated glass comprising
a first glass plate,
a second glass plate facing the first glass plate, and
between the first glass plate and the second glass plate, a light control member to which a power feeder is connected, a bonding portion and a sealing member,
wherein the sealing member overlaps with at least a part of the periphery of the first glass plate, in a plan view,
the bonding portion is in contact with the first glass plate, the second glass plate, and a first principal surface, a second principal surface and side surfaces of the light control member, and
the bonding portion contains a curable transparent resin.

2. The laminated glass according to claim 1, wherein the sealing member is in contact with at least one of the first glass plate and the second glass plate.

3. The laminated glass according to claim 1, wherein the bonding portion has a first adhesive layer,
the curable transparent resin in the bonding portion is contained in the first adhesive layer, and
the first adhesive layer is in contact with the first glass plate, the sealing member, and a first principal surface and side surfaces of the light control member.

4. The laminated glass according to claim 3, wherein the first adhesive layer is in contact with the second glass plate.

5. The laminated glass according to claim 3, wherein the first adhesive layer has a thickness of 1 μm or more and 1000 μm or less.

6. The laminated glass according to claim 3, wherein the first adhesive layer has a shear modulus at 25° C. of $1.0 \times 10^3$ Pa or more and $2.0 \times 10^5$ Pa or less.

7. The laminated glass according to claim 3, wherein the bonding portion has a second adhesive layer,
the second adhesive layer has a transparent pressure-sensitive adhesive sheet, and
the second adhesive layer is in contact with the first adhesive layer, a second principal surface of the light control member and the second glass plate.

8. The laminated glass according to claim 3, wherein
the bonding portion has a second adhesive layer and a third adhesive layer,
the second adhesive layer has a transparent pressure-sensitive adhesive sheet, and
between the second adhesive layer and the third adhesive layer, there is a resin film,
the second adhesive layer is in contact with the resin film and the second glass plate, and
the third adhesive layer is in contact with the resin film and a second principal surface of the light control member.

9. The laminated glass according to claim 7, wherein the second adhesive layer is in contact with the sealing member.

10. The laminated glass according to claim 7, wherein the second adhesive layer has a thickness of 1 μm or more and 1000 μm or less.

11. The laminated glass according to claim 7, wherein the second adhesive layer has a shear modulus at 25° C. of $1.0 \times 10^3$ Pa or more and $2.0 \times 10^5$ Pa or less.

12. The laminated glass according to claim 1, wherein the bonding portion has an ultraviolet absorber.

13. The laminated glass according to claim 12, wherein the ultraviolet absorber contains at least one member selected from the group consisting of a benzophenone compound, a benzotriazole compound, a triazine compound, an azomethine compound, an indole compound, a dibenzoyl resorcinol derivative, a benzodithiol compound and an oxazolone compound.

14. The laminated glass according to claim 12, wherein the ultraviolet absorber is an ultraviolet absorber having a moiety with high compatibility with the curable transparent resin bonded.

15. The laminated glass according to claim 12, wherein the curable transparent resin contains a silicone curable transparent resin, and the ultraviolet absorber contains a silicone-modified ultraviolet absorber.

16. The laminated glass according to claim 12, wherein the bonding portion has a transmittance for ultraviolet light having a wavelength of 380 nm of 0% or more and 20% or less.

17. The laminated glass according to claim 1, wherein both the first glass plate and the second glass plate have a curved shape.

18. The laminated glass according to claim 1, wherein the light control member has a light control device containing a liquid crystal.

19. The laminated glass according to claim 18, wherein the light control device has a rotational viscosity at 25° C. of 2000 mPa·s or less.

20. A method for producing a laminated glass comprising a first glass plate,
a second glass plate facing the first glass plate, and
between the first glass plate and the second glass plate, a light control member to which a power feeder is connected, a bonding portion and a sealing member,
which comprises a forming step of forming the sealing member on at least a part of the periphery of at least one of the first glass plate and the second glass plate in a plan view and forming the bonding portion containing a curable transparent resin on a principal surface of at least one of the first glass plate and the second glass plate,
a laminating step of forming a laminate in which the first glass plate, the bonding portion and the second glass plate are laminated in this order, and the bonding portion is in contact with the first glass plate, the second glass plate, and a first principal surface, a second principal surface and side surfaces of a light control member to which a power feeder is connected, and
a bonding step of bonding the first glass plate, the bonding portion, the second glass plate and the sealing member with one another in the laminate.

21. The method for producing a laminated glass according to claim 20, wherein in the bonding step, the absolute pressure applied to the bonding portion is less than 0.5 MPa and the temperature applied to the bonding portion is less than 120° C.

22. The method for producing a laminated glass according to claim 21, wherein in the bonding step, the temperature applied to the bonding portion is less than 100° C.

* * * * *